US007756042B2

(12) United States Patent
Guo et al.

(10) Patent No.: US 7,756,042 B2
(45) Date of Patent: Jul. 13, 2010

(54) BANDWIDTH GUARANTEED PROVISIONING IN NETWORK-BASED MOBILE VIRTUAL PRIVATE NETWORK (VPN) SERVICES

(75) Inventors: Katherine H. Guo, Eatontown, NJ (US); Sarit Mukherjee, Morganville, NJ (US); Sanjoy Paul, Morganville, NJ (US); Sampath Rangarajan, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1891 days.

(21) Appl. No.: 10/772,080

(22) Filed: Feb. 4, 2004

(65) Prior Publication Data
US 2004/0168088 A1 Aug. 26, 2004

Related U.S. Application Data

(63) Continuation-in-part of application No. 10/374,940, filed on Feb. 26, 2003, now abandoned.

(51) Int. Cl.
*H04L 12/28* (2006.01)
*H04W 40/00* (2009.01)
*G06F 9/00* (2006.01)
*G06F 17/00* (2006.01)

(52) U.S. Cl. ............... 370/238; 370/351; 370/468; 455/445; 455/446; 726/15

(58) Field of Classification Search ............. 455/466; 370/468, 395.4, 351–352
See application file for complete search history.

(56) References Cited

U.S. PATENT DOCUMENTS 7,136,386 B2* 11/2006 Allen et al. .......... 370/395.5

7,376,125 B1* 5/2008 Hussain et al. .......... 370/352
2002/0018456 A1 2/2002 Kakemizu et al.

(Continued)

FOREIGN PATENT DOCUMENTS

EP 1 176 781 A2 1/2002

(Continued)

OTHER PUBLICATIONS

Communication dated Aug. 13, 2004/European Search Report dated Aug. 5, 2004 EP 04 25 0831.

*Primary Examiner*—Nick Corsaro
*Assistant Examiner*—Tangela T. Chambers
(74) *Attorney, Agent, or Firm*—Wall & Tong, LLP

(57) ABSTRACT

A method and virtual private network (VPN) system for providing bandwidth guaranteed provisioning in network-based mobile VPN services. The method and system include identifying a set of VPN customers, at least one mobile access point (MAP) and at least one customer premise equipment (CPE) associated with each VPN customer, and at least one Internet Protocol (IP) service gateway (IPSG) for facilitating VPN tunneling between a MAP and a CPE, wherein each MAP is geographically remote from each IPSG. A subset of IPSGs is selected to maximize total profit resulting from provisioning a subset of VPN customers on the selected IPSGs. Total profit from all the customers includes the sum of profits from each customer, where for each customer, the customer profit equals weighted revenue less cost, wherein the cost per customer includes a total tunnel bandwidth cost from the MAP to the CPE, and a cost of provisioning an IPSG node.

22 Claims, 9 Drawing Sheets

U.S. PATENT DOCUMENTS

2002/0091801 A1    7/2002  Lewin et al.
2003/0095542 A1*   5/2003  Chang et al.  ................. 370/352
2003/0229613 A1*  12/2003  Zargham et al.  ............... 707/1
2004/0068668 A1*   4/2004  Lor et al.  .................... 370/235

FOREIGN PATENT DOCUMENTS

WO      WO 02/37876  A1    5/2002

* cited by examiner

US 7,756,042 B2

BANDWIDTH GUARANTEED PROVISIONING IN NETWORK-BASED MOBILE VIRTUAL PRIVATE NETWORK (VPN) SERVICES

CROSS-REFERENCE

This patent application is a continuation-in-part of and claims priority to commonly owned U.S. patent application Ser. No. 10/374,940, filed Feb. 26, 2003, now abandoned the entire contents of which are incorporated by reference herein.

FIELD OF INVENTION

The present invention relates to virtual private network (VPN) services. More specifically, the present invention relates to a service for providing connectivity for mobile devises utilizing VPN services.

DESCRIPTION OF THE BACKGROUND ART

A Virtual Private Network (VPN) is a cost effective and secure way of extending enterprise network resources over a shared public data network. Most popular uses of VPNs are to interconnect multiple geographically dispersed sites of an enterprise (known as intranet/extranet VPN) and to provide remote users access to the enterprise resources (known as remote access VPN). In particular, a virtual private network (VPN) is an overlay network that uses the public network to carry data traffic between corporate sites and users, maintaining privacy through the use of tunneling protocols and security procedures.

In the network-based VPN model, an intranet/extranet VPN is created by interconnecting Customer Premise Equipments (CPE) of the enterprise to one or more VPN-aware network elements provisioned for the enterprise customer. A remote access VPN is created by tunneling the remote user's connection to a VPN-aware network element provisioned for the enterprise customer that the user belongs to. The VPN-aware network element then tunnels the connection to the appropriate CPE using tunnel concatenation. One such VPN-aware network element is a service switch called the IP Services Gateway (IPSG). An IPSG can be provisioned to serve a number of enterprise VPN customers each with a number of end users.

The basic method of setting up a VPN from a user or a site to secure enterprise resources is to set up a secure data connection between them over the underlying insecure shared network. An IPSG usually sets up two secure tunnels, one from the user/site to the IPSG itself, and the other from the IPSG to the enterprise. The IPSG is also responsible for maintaining separate and independent security associations with both ends, namely the user/site and the enterprise. The data flows end-to-end through the concatenated tunnel via the IPSG. Note that in a network-based VPN model, the network does not simply act as a conduit, but enables the VPN service. Moreover, the IPSG can enable other value-added services from the tunnel concatenation points. Examples include better QoS guarantees for VPN tunnels, service differentiation among users, offloading of Internet traffic from the enterprise intranet, and the like.

The IPSG provisioning process creates virtual instances of routing mechanisms for each of the customers facilitated in the IPSG. In one possible implementation, each instance may be a separate (virtual) router running customer specific routing algorithms. In other implementations, each instance could be distinct customer specific route entries in the partitioned routing table. As such, each routing instance requires a considerable amount of computing resources. Further, since all the instances share the common resources of the IPSG, the number of VPN customers that can be provisioned on an IPSG is limited. There is a similar restriction on the number of tunnels an IPSG can support. Moreover, due to physical resource constraints, configuring an IPSG with increased number of provisions reduces the number of tunnels that can be handled, and vice versa. IPSG provisioning per customer is usually carried out statically because of the complexity of the process and IPSG provisioning is not changed frequently.

At present, remote access VPNs are mostly limited to end users connecting to the enterprise from remote locations using wireline access like dial-up, DSL, and Cable-Modem lines. With the emergence of high-speed wireless data services in 2.5G and 3G wireless technologies, VPN usage from mobile nodes (that is, mobile VPN services) is growing exponentially.

In order to enable mobile data services, a network service provider (NSP) installs wireless access devices at the edge of its network. Radio-to-packet network gateways (i.e., Mobile Access Points (MAPs)) connect the access devices to the data network. To set up a data session, a mobile end user (hereinafter termed a "mobile node" (MN)) must first connect to a MAP, which then routes the session towards the destination CPE through an appropriately provisioned IPSG. A mobile data session originating from a MN to a MAP, and then routed through an IPSG to the enterprise CPE, is the basis of a network-based mobile VPN service. Currently, the IPSG and MAP are collocated in the network, where an IPSG/MAP performs radio to packet network gateway functions to terminate the MN's connection, as well as conducting other IPSG specific functions.

FIG. 1 depicts a high-level block diagram of a prior art mobile IP network 100. In such a scenario the MN is not free to choose an IPSG, rather its data sessions are anchored to the IPSG serving the MN's current roaming region. Note that the VPN service can be initiated only after the MN has started the data session.

The exemplary network 100 comprises a backbone network 102, such as the Internet, a plurality of enterprise networks $120_1$ through $120_r$ (collectively enterprise networks 120), and a network service provider (NSP) 101. The enterprise networks 120 each include at least one customer premise equipment (CPE) 122 and a plurality of mobile nodes (MN) $130_1$ through $130_m$ collectively MNs 130). In this example, there are three VPN customers A, B and C, each with a corresponding intranet site 120. Customer A has two CPEs $122_{11}$ and $122_{12}$, while customers B and C each have one CPE $122_{21}$ and $122_{r k}$.

The NSP 101 comprises a network service provider access network 104 having a plurality of IPSGs $106_1$ through $106_q$ (collectively IPSGs 106). As shown in FIG. 1, $IPSG_1$ $106_1$ is provisioned for customer A $120_1$, $IPSG_2$ $106_2$ is provisioned for customers B and C $120_2$ and $120_r$ (where r illustratively equals 3), $IPSG_3$ $106_3$ is provisioned for all three customers A, B, and C, $120_1$, $120_2$, and $120_3$ and so on. This implies that $IPSG_1$ $106_1$ has a routing instance for customer A, and a security association with $CPE_{A1}$ $122_{11}$ and $CPE_{A2}$ $122_{12}$. The security association is used to securely tunnel packets between $IPSG_1$ $106_1$ and the CPEs for customer A (that is, they have a pre-established secure tunnel). Similar associations hold for other IPSGs as well. In an instance where an MN $130_1$ belonging to customer A roams into the region served by $IPSG_1$ $106_1$, the MN successfully initiates a data session with $IPSG_1$ $106_1$. Thereafter, the MN requests a VPN connection to $CPE_{A1}$ $122_{11}$. The $IPSG_1$ serves this request by constructing a secure tunnel between the MN $130_1$ and $IPSG_1$ $106_1$ and concatenating it with the pre-established tunnel illustratively between $IPSG_1$ $106_1$ and $CPE_{A1}$ $122_{11}$.

Afterwards, when this MN $130_1$ roams into the region served by $IPSG_2$ $106_2$, the data session is reestablished with $IPSG_2$ $106_2$. However, when the MN requests for the VPN service, $IPSG_2$ $106_2$ cannot provide such VPN service, since $IPSG_2$ $106_2$ is not provisioned for customer A. That is, $IPSG_2$ $106_2$ is not logically connected to $CPE_{A1}$ $122_{11}$ in a secure fashion. Later on, when this MN roams into the region serviced by $IPSG_3$ $106_3$, the data session again is reestablished with $IPSG_3$ $106_3$. When the MN $130_1$ requests for the VPN service, $IPSG_3$ $106_3$ is able to provide the VPN session, since $IPSG_3$ $106_3$ is provisioned for customer A.

Presently, in one solution termed "uniform-provision", in addition to IPSG $IPSG_1$ $106_1$, $IPSG_3$ $106_3$, and $IPSG_5$ $106_{q=5}$, the NSP also provisions $IPSG_2$ $106_2$ and $IPSG_4$ $106_4$ for customer A. The first uniform-provision solution implies that every IPSG 106 in the network is provisioned for all the customers of the NSP. This is required because of the mobile nature of the users, that is, an MN belonging to any customer can roam into the region served by any IPSG 106 and request for service. Therefore, no IPSG 106 can a priori assume that it would serve only a subset of the customers.

For example, suppose the NSP has "N" IPSGs and each can support at most "M" different provisions (recall that the number of VPN customers that can be provisioned per IPSG is limited). The total number of different provisions the NSP 100 can provide is therefore M×N. However, under this solution each IPSG 106 must be provisioned exactly the same way with every VPN customer. In practice, every VPN customer must be provisioned on every IPSG 106, and this limits the total number of supported VPN customers to merely M. Accordingly, this connectivity solution does not scale with the number of subscribed VPN customers. This, however, is not a problem for non-mobile VPN services such as remote access VPNs from home and intranet/extranet VPNs, since the NSP knows a priori, which customers are going to connect to which IPSGs (due to their geographic locations) and can statically provision the IPSGs with only the relevant subset of VPN customers.

A second solution, termed "tunnel-switching", allows an IPSG to be provisioned for a subset of customers. For example, $IPSG_2$ $106_2$ tunnels the MN's data session to an IPSG that is provisioned for customer A, such as $IPSG_1$ $106_1$. The tunnel-switching solution requires each IPSG 106 to be aware of the provisions made by other IPSGs, detect the identity of the MN, and tunnel switch the session to an appropriate IPSG 106. It is noted that in certain cases, this method results in using more than one tunnel to connect an MN 130 to the appropriately provisioned IPSG 106.

The second tunnel-switching solution provisions each IPSG with a subset of VPN customers, and supports mobility through tunnel switching the MN's data sessions from the IPSG in the MN's roaming area to the appropriately provisioned IPSG. That is, the tunnel-switching solution maintains connectivity by using two or more tunnels to connect an end user to the appropriate IPSG 106.

The tunnel-switching second solution for providing MN-IPSG-CPE connectivity does not scale, since in order to handle more VPN customers, the IPSGs must support more tunnels, which in turn will reduce the number of provisions that can be made per IPSG 106. Moreover, tunnel switching among IPSGs leads to undesirable redirection of connections (commonly known as "dog-legging") within the NSP's network, which results in an inefficient usage of network links.

SUMMARY OF THE INVENTION

The disadvantages heretofore associated with the prior art, are overcome by the present invention of a method and apparatus for optimally provisioning connectivity in network-based mobile virtual private network (VPN) services. The apparatus includes provisioning each of a plurality of IP service gateways (IPSGs) to support virtual private network (VPN) tunneling between customer premise equipment of a subset of VPN customers and at least one mobile access point (MAP). The MAPs are geographically remote from the plurality of IPSGs, and each of the MAPs support VPN tunneling to mobile nodes of the subset of VPN customers.

In one embodiment, a first method includes for each customer, selecting a subset of IPSGs to maximize total profit resulting from provisioning the customers on the selected IPSGs, wherein the total profit from all the customers comprises the sum of profits from each customer, where for each customer profit (G) equals weighted revenue less cost. The weighted revenue includes revenue and a relative weight factor $\gamma$ on revenue compared to cost, where $\gamma$ allows a network service provider to adjust price based on cost of the customer. Further, the cost per customer comprises a total tunnel connection cost from the MAP to the CPE, and a current cost of provisioning an IPSG node, wherein the total tunnel connection cost comprises a dynamic tunnel connection cost between the MAP and the provisioned IPSG, and a static tunnel connection cost between the provisioned IPSG and the CPE.

In a second embodiment, a method and virtual private network (VPN) system architecture is provided for providing bandwidth guaranteed provisioning in network-based mobile VPN services. The method and system architecture include identifying a set of VPN customers, at least one mobile access point (MAP) and at least one customer premise equipment (CPE) associated with each VPN customer, and at least one IP service gateway (IPSG) for facilitating VPN tunneling between a MAP and a CPE, wherein each MAP is geographically remote from each IPSG. A subset of IPSGs is selected to maximize total profit resulting from provisioning a subset of VPN customers on the selected IPSGs. Total profit from all the customers includes the sum of profits from each customer (l), where for each customer, profit ($U^l$) equals weighted revenue ($\gamma V^l$) less cost ($C^l$) ($U^l=\gamma V^l-C^l$), wherein the cost per customer includes a total tunnel bandwidth cost ($C^l_C$) from the MAP to said CPE, and a cost ($C^l_P$) of provisioning an IPSG node.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a method and apparatus for provisioning VPN-aware devices in an hierarchical network architecture for mobile virtual private networks (VPNs). The methods discussed herein take into account the cost of links over which VPN tunnels are established, the cost of establishing a tunnel, the cost of provisioning a VPN customer on a VPN-aware device, such as an IP service gateway (IPSG), and redundancy in IPSG provisioning for fault tolerance.

Figure 1:
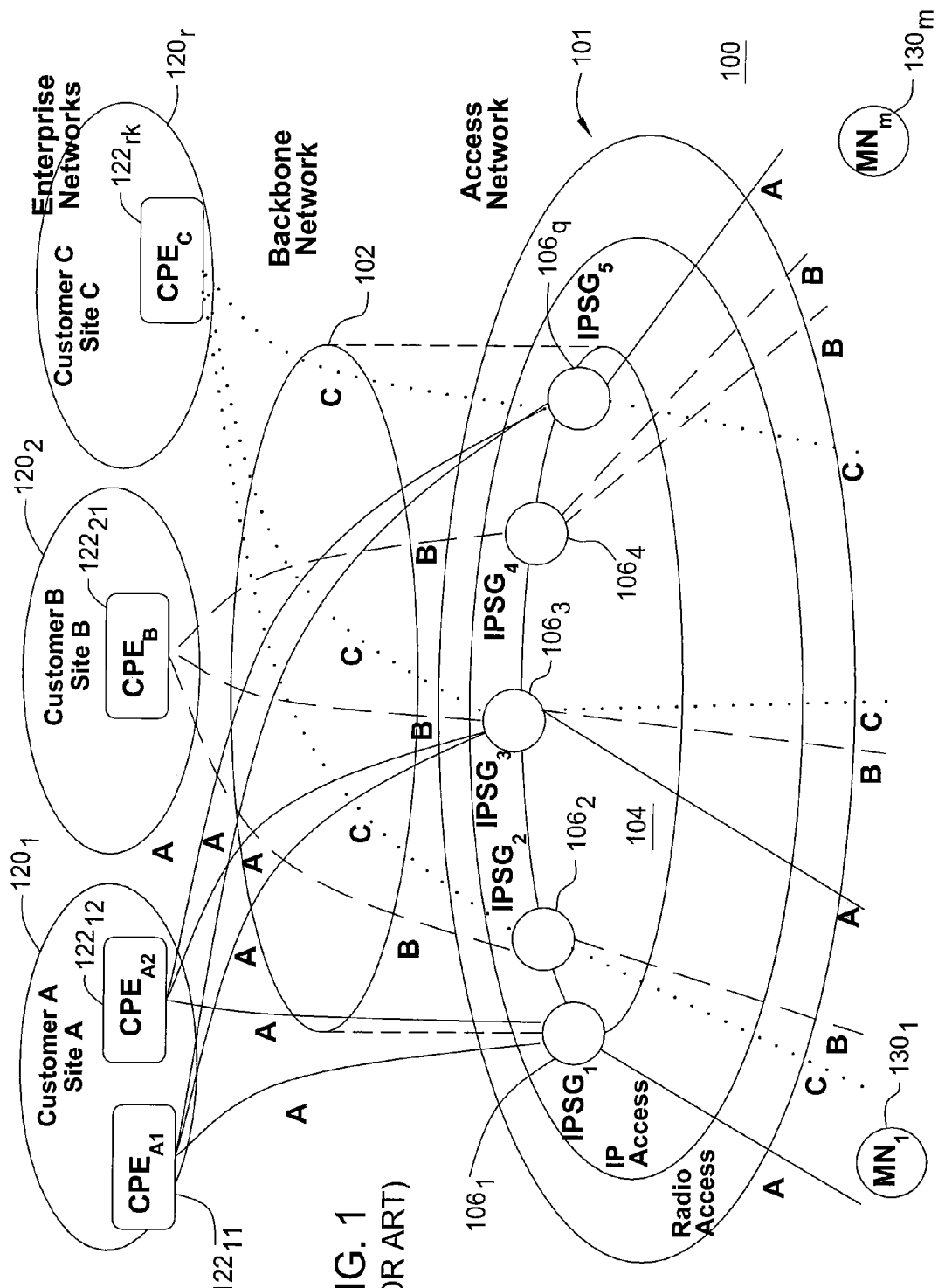
FIG. 1 depicts a high-level block diagram of an exemplary prior art mobile IP network.
Figure 2:
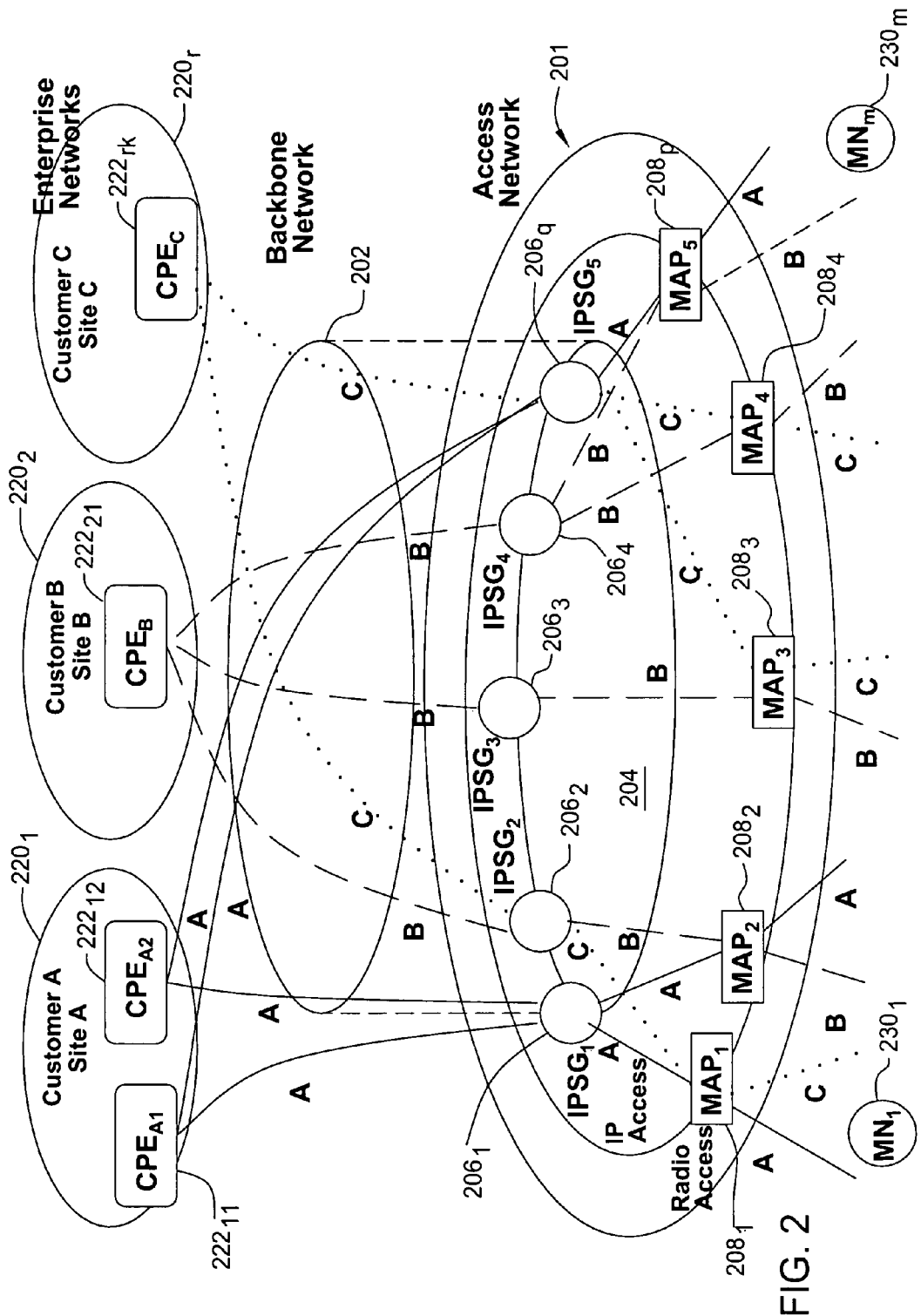
FIG. 2 depicts a high-level block diagram of an exemplary mobile IP network of the present invention.

FIG. 2 depicts a high-level block diagram of an exemplary mobile IP network 200 of the present invention. The exemplary network 200 comprises a backbone network 202, such as the Internet, a plurality of enterprise networks $220_1$ through $220_r$ (collectively enterprise networks 220), a service provider 201 (e.g., network service provider (NSP)), and a plurality of mobile nodes (MN) $230_1$ through $230_m$ collectively MNs 230).

The enterprise networks 220 may be an intranet/extranet network, each having at least one customer premise equipment 222. In this example, there are three VPN customers A, B, and C, each with a corresponding intranet site 220. Customer A has two CPEs $222_{11}$ and $222_{12}$, while customers B and C each have one CPE $222_{21}$ and $222_{rk}$. The CPE 222 typically includes a customer edge router, or Layer Two Tunneling Protocol (L2TP) network server, among other conventional customer network equipment.

The service provider 201 includes a network service provider access network 204 having a plurality of IP service gateways (IPSGs) $206_1$ through $206_q$ (collectively IPSGs 206) and a plurality of wireless access devices 208 positioned at the edge of the network 204, separate and apart from the IPSGs 206. That is, in order to enable mobile data services, the NSP 201 installs the wireless access devices 208 at the edge of its network 204.

In one embodiment, the wireless access devices 208 are radio-to-packet network gateways, hereinafter termed Mobile Access Points (MAPs), which are used to connect the access devices to the data network. Accordingly, a packet data serving node (PDSN) in the CDMA 2000 architecture or a gateway GPRS support node/serving GPRS support node (GGSN/SGSN) in the UMTS architecture may serve as the MAPs. To set up a data session, a mobile end user utilizing a mobile node (MN) 230 must first connect to a MAP 208, which then routes the session towards the destination CPE through an appropriately provisioned IPSG. Thus, a network-based mobile VPN service mobile data session originates from an MN 230 to a MAP 208, and is then routed through a particular IPSG 206 to the enterprise CPE 222.

In the network-based VPN architecture of FIG. 2, the MAPs 208 are separately and hierarchically located from the IPSGs 206. In particular, a MAP 208 serves a region, and all MNs 230 within that region, regardless of customer association, connect to the MAP 208 to initiate data sessions. Each IPSG 206 is statically provisioned for only a subset of the enterprise VPN customers. The subsets per IPSG 206 are chosen so that at least one IPSG is provisioned for each customer.

In the illustrative embodiment shown in FIG. 2, $IPSG_1$ $206_1$ and $IPSG_5$ $206_{q=5}$ are provisioned for VPN customer A $220_1$, and $IPSG_2$ $206_2$, $IPSG_3$ $206_3$, and $IPSG_4$ $206_4$ are provisioned for VPN customer B $220_2$. Similarly, $IPSG_2$ $206_2$ and $IPSG_5$ $206_5$ are provisioned for VPN customer C $220_{r=3}$. Mobile traffic destined to customer A is directed by MAPs 208 to either $IPSG_1$ $206_1$ or $IPSG_5$ $206_5$, depending on the location of the MN 230. Each IPSG 206 only needs to support a subset of the three VPN customers 220.

An IPSG maintains the virtual routing instance and security association with each provisioned VPN customer 220. Each MAP 208 maintains a simple and fairly static list of customer-to-IPSG mappings. It is noted that the list changes only when a new customer 220 subscribes to the VPN service offered by the NSP, which is very infrequent. When an MN 230 requests a VPN connection to its respective CPE 222, the MAP 208 identifies the customer the MN belongs to, and routes and/or tunnel switches the connection to the appropriate IPSG 206 provisioned for the customer.

In particular, the MNs 230 are identified using, for example, conventional Network Access Identifiers (NAI) and/or Access Point Names (APN). A MAP extracts the NAI/APN of the MN 230 during connection setup time with the MN. The MAP can then identify the destination CPE 222 directly from the NAI/APN, if there is only one CPE 222. If there is more than one CPE 222, the MAP can determine the MN's 230 preferred CPE 222 from an Authentication, Authorization and Accounting (AAA) Server of the service provider 201.

By illustration, in an instance where an MN $230_1$ belonging to customer A roams into the region served by $MAP_1$ $208_1$, the MAP $208_1$ identifies the customer the MN $230_1$ belongs to, and routes and/or tunnel switches the connection to the appropriate IPSG 206 provisioned for the customer. In this example, the connection is routed to $IPSG_1$ $206_1$. The $IPSG_1$ $206_1$ serves this request by constructing a secure tunnel between the MN $230_1$ and $IPSG_1$ $206_1$ and concatenating it, with the pre-established tunnel between $IPSG_1$ $206_1$ and, illustratively, $CPE_{A1}$ $222_{11}$.

If the MN $230_1$ roams into a region served by $MAP_2$ $206_2$, the connection is also routed to $IPSG_1$ $206_1$. Similarly, if the MN $230_1$ roams into a region served by either $MAP_3$ $206_3$ or $MAP_4$ $206_4$, the connection is also routed to $IPSG_1$ $206_1$ or $IPSG_5$ $206_{q=5}$ (connections not shown in FIG. 2).

Accordingly, one aspect of the present invention is to separate mobility from services, where a MAP 208 deals with mobility of users, while an IPSG 206 offers VPN services. This is a natural division of functions because IPSGs are designed to support services for stationary locations, while the MAPs are designed to handle mobility by providing dynamic switching and routing.

The above approach solves the scalability issues for the MN-IPSG-CPE connectivity problem. The scalability in provisioning is addressed by allocating a subset of VPN customers per IPSG, with at least one provision for every customer. In other words, this approach provisions a subset of IPSGs per customer. Compared with the existing architecture where each customer has to be provisioned on every IPSG, the hierarchical approach naturally offers improved scalability. The tunnel switching and associated dog-legging are taken care of by locating MAPs 208 separately and hierarchically with respect to IPSGs 206. In this hierarchical design, the MAPs 208 offer tunnel switching/traffic redirection functionalities. Therefore the MAPs 208 are able to separate intranet VPN traffic from internet traffic, direct VPN traffic to the appropriate IPSGs 206, and direct internet traffic to appropriate internet proxies in the NSP network 204. This value-added Internet traffic offloading service effectively saves bandwidth for the NSP 201 and its customers over the existing architecture where MAPs 208 and IPSGs 206 are collocated.

Thus, in order to establish the NSP's network connectivity, each VPN customer is mapped to a subset of IPSGs 206. One solution is to map/provision as many customers as possible on one IPSG 206, and then use a second IPSG 206 only when the current one is full. However, this technique does not utilize the resources fully. That is, it creates hot spots and degrades the overall performance of the network.

Alternatively, in an embodiment of the present invention, a subset of IPSGs 206 is chosen in an optimal fashion for each customer, so that all the IPSGs 206 are equally provisioned/utilized, while there is also room for inclusion of future customers. Determining the best set of IPSGs 206 to provision for each customer includes various factors, such as the cost of links over which VPN tunnels are established, the cost of establishing a tunnel, the cost of provisioning a VPN customer on an IPSG 206, and redundancy in IPSG provisioning for fault tolerance.

Figure 3:
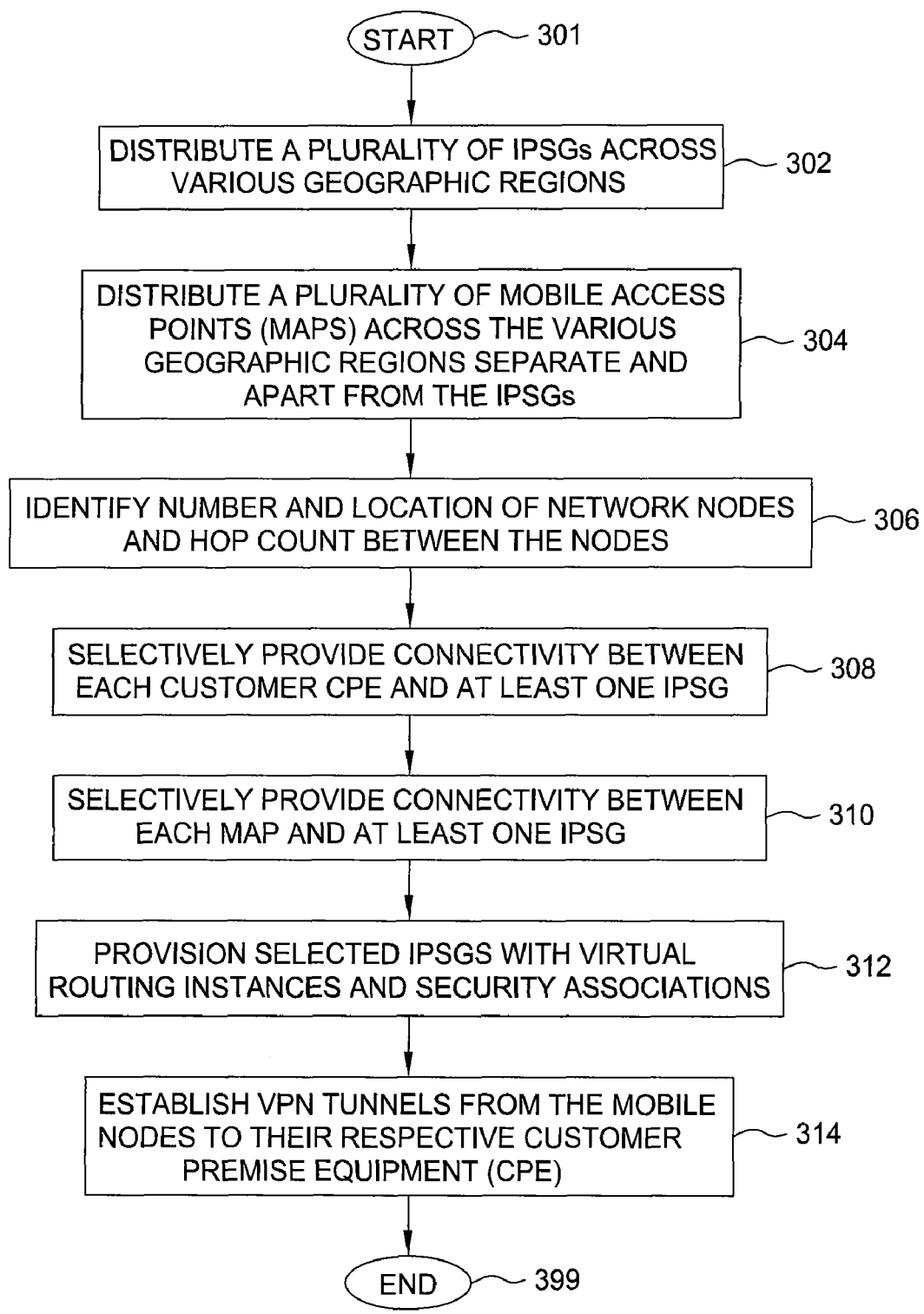
FIG. 3 depicts a flow diagram of a method for providing virtual private network (VPN) services based on link costs.

FIG. 3 depicts a flow diagram of a method 300 for providing virtual private network (VPN) services based on link costs. The method 300 begins at step 301, and proceeds to step 302, a network service provider (NSP) 201 strategically distributes a plurality of IPSGs 206 across various geographic regions, such as, for example, in various parts of a large city, across a state, and/or nationwide. At step 304, the NSP 201 distributes a plurality of mobile access points (MAPs) 208 across the various geographic regions, such that the MAPs 208 are located separate and apart from the IPSGs 206.

The method 300 then proceeds to step 306, where the number and location of network nodes are identified. When the NSP 201 deploys the nodes in the network, the number and location of each IPSG 206 and MAP 208 are identified. Further, the number of customers and their respective intranets 220 and CPEs 222 are also identified. Also identified is the hop count between the nodes, such that an end-to-end hop count may be determined from a MN 230 to a CPE 222. Once the nodes and hop counts have been identified, the method 300 then proceeds to step 308.

At step 308, the NSP 201 selectively provides connectivity between each customer 220 (i.e., CPE 222) and at least one IPSG 206. That is, a determination is made to resolve particular subsets of IPSGs 206 to be provisioned for a customer. Selecting a subset of the plurality of IPSGs 206 to serve each customer 220 is based on a cost analysis algorithm, which is discussed below in further detail with respect to FIG. 5. At step 310, the NSP 201 selectively provides connectivity between each MAP 208 and at least one IPSG 206. Selection of the IPSGs 206 to support the MAPs 208 is also based on cost analysis, which is also discussed below in further detail with respect to FIG. 5. The method 300 then proceeds to step 312.

At step 312, the selected IPSGs 206 are provisioned with virtual routing instances and security associations for the customer. At step 314, the provisioned IPSGs 206 are used to establish VPN tunnels to the corresponding CPEs 222 of the customer. In particular, VPN tunnels may be established from the mobile nodes 230 to their respective CPE 122 via a MAP 208 serving the mobile node 230 and a customer specific IPSG 206. The method 300 then proceeds to step 399, where the users participate in a VPN session and the method 30.0 ends.

Figure 4:
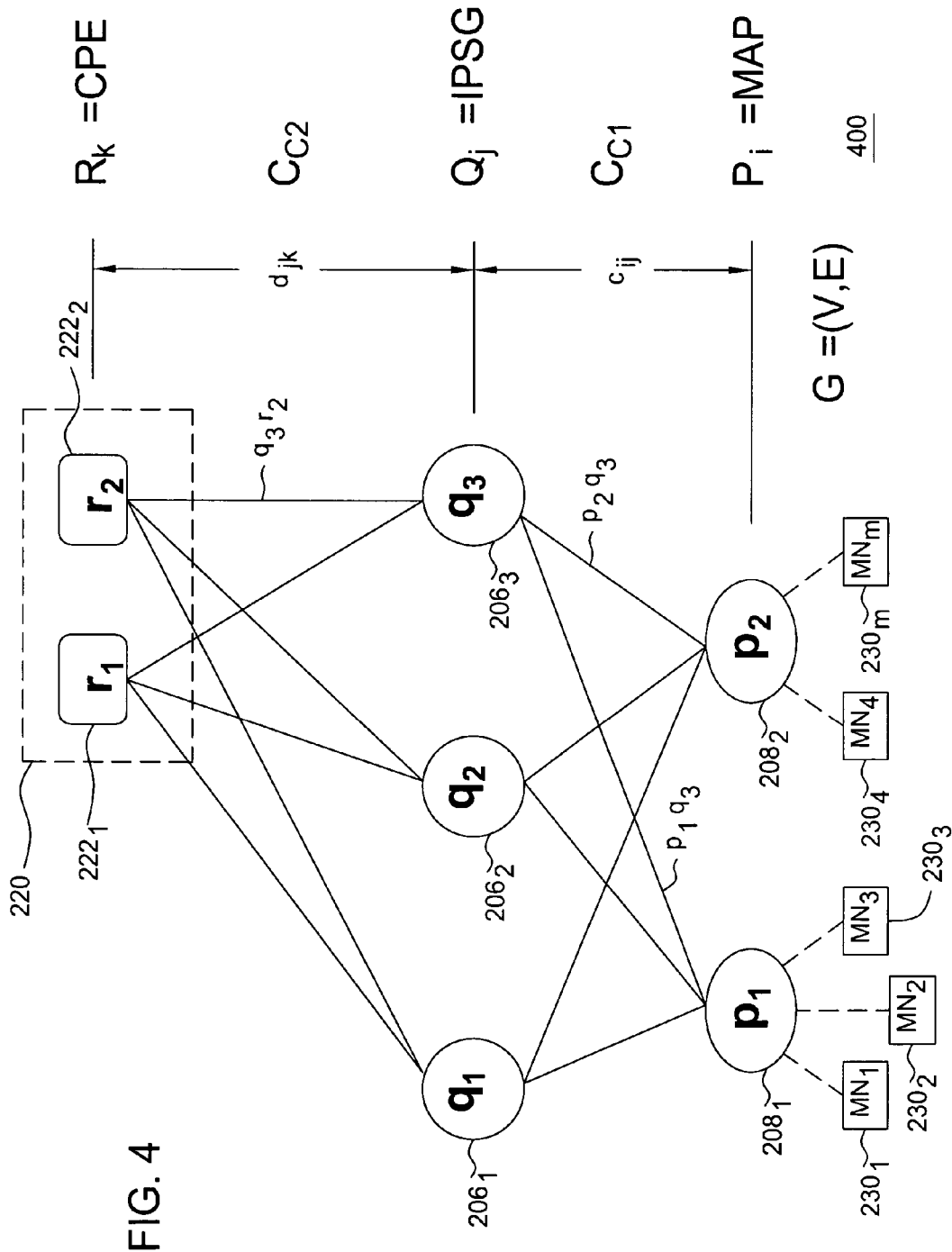
FIG. 4 depicts a schematic diagram of a first undirected graph for a single customer.

FIG. 4 depicts a schematic diagram of a first undirected graph 400 for a single customer. In particular, FIG. 4 depicts a schematic diagram of a first undirected graph 400 having a set of nodes and a set of links, and is suitable for understanding method 300 of FIG. 3. The network illustratively comprises "i" MAPs 208, "j" IPSGs 206, and "k" CPEs 222 for a given customer, respectively denoted by $p_i$, $q_j$, and $r_k$. In the exemplary graph 400 of FIG. 4, the network 400 comprises two MAPs $208_1$ and $208_2$ denoted $p_1$ and $p_2$, three IPSGs $206_1$, $206_2$, and $206_3$ denoted $q_1$, $q_2$, and $q_3$ in the network 400, and a single customer 220 having two CPEs $222_1$ and $222_2$ denoted $r_1$ and $r_2$ for the customer. Furthermore, a plurality of mobile nodes $230_1$ through $230_m$ (where m is an integer greater than 1) is illustratively shown coupled to the MAPs 208. Specifically, $MN_1$ $230_1$ through $MN_3$ $230_3$ have connectivity to MAP $P_2$ $208_1$, while $MN_4$ $230_4$ and $MN_m$ $230_m$ have connectivity to MAP $P_2$ $208_2$.

It is noted that multiple VPN customers are considered in a batch and the best set of IPSGs are determined to provision for the batch that will maximize the profit. For each customer, the CPEs in the customer's intranet, and all of the IPSGs and MAPs in the NSP network are considered.

The network of IPSGs 206, MAPs 208, and the customer's CPEs 222 is modeled as an undirected graph G=(V, E), where V is the set of nodes and E is the set of links. Graph nodes in V correspond to the CPEs 222, IPSGs 206, and MAPs 208 only. Graph links in E may be categorized as a link between a MAP 208 and an IPSG 206 corresponds to the chosen path between the corresponding MAP and the IPSG, and a link between an IPSG 206 and a CPE 222 corresponds to the chosen path therebetween. A routing algorithm based on a particular routing objective computes the chosen paths. The routing objective may be the shortest path based on hop counts, or the lowest-cost path based on the cost assigned to network links, both of which can be computed by open shortest path first (OSPF). The routing objective may also be a traffic-engineered path such as an ATM VC or an MPLS Label Switched Path. In the hierarchical architecture of the present invention, traffic flows from MNs 230 to the CPEs 222 through the MAPs 208 and IPSGs 206. Therefore, only links between them are considered.

Referring to FIG. 3, at step 308, a subset of the IPSGs 206 is selected for each customer. The establishment of a VPN tunnel over a physical network link incurs a certain cost associated with the link. The cost of a link between two nodes in the graph then becomes the computed cost of the VPN tunnel between the corresponding network nodes. In practice, depending on the requirement of the VPN customer, the link cost may be the number of hops in the underlying physical network or a fraction of the bandwidth capacity of the physical links, among other link cost measuring techniques. For purposes of understanding the invention, link costs are discussed in terms of an optimal connectivity between the MAPs and the CPEs (i.e., number of hops), as opposed to computing link costs using bandwidth capacity of a physical link.

Since only one VPN tunnel is established between an IPSG and a CPE for the same customer, the cost of a link from an IPSG to a CPE is considered only once for each customer. For example, referring to FIG. 4, IPSG $q_3$ $206_3$ may have two tunnels formed from MAPs $p_1$ and $p_2$ $208_1$ and $208_2$ via respective links $p_1q_3$ and $p_2q_3$. However, only one shared tunnel is utilized between the IPSG $q_3$ $206_3$ and CPE $r_2$ $222_2$ for those MNs connecting to CPE $r_2$ $222_2$.

Figure 5:
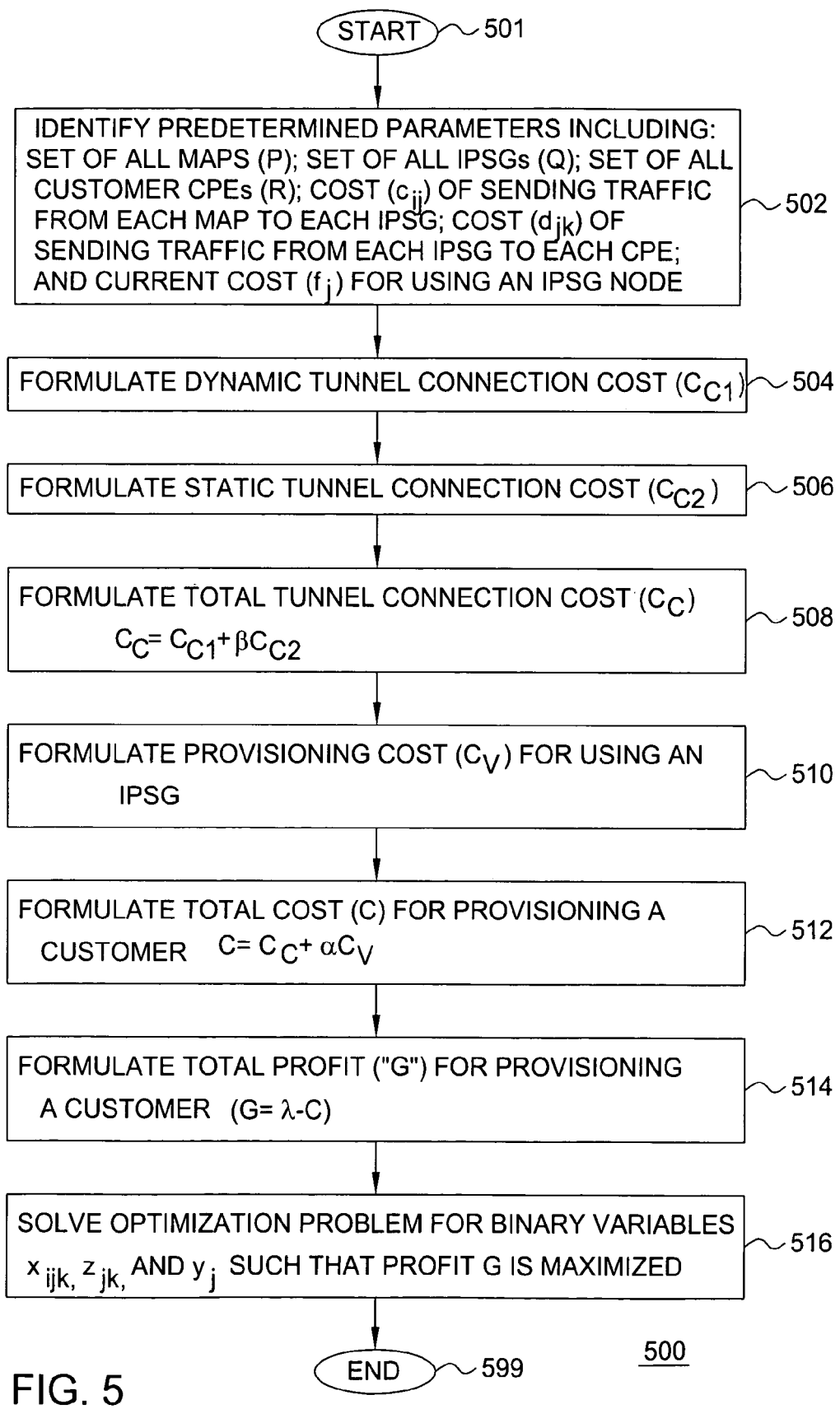
FIG. 5 depicts a flow diagram of a method suitable for selecting a subset of IP service gateways (IPSGs) to provision a single VPN customer in accordance with the method of FIG. 3.

FIG. 5 depicts a flow diagram of a method 500 suitable for selecting a subset of IP service gateways (IPSGs) to provision a VPN customer in accordance with the method of FIG. 3. In particular, method 500 is suitable for providing step 308 of FIG. 3. Method 500 starts at step 501, and proceeds to steps 502, where predetermined network parameters are identified. In particular, the predetermined network parameters include a set of all MAPs (P), a set of all IPSGs (Q), a set of all customer CPE (R), the cost ($c_{ij}$) of sending traffic from each MAP 208 to each IPSG 206, the cost ($d_{jk}$) of sending traffic from each IPSG 206 to each CPE 222, and the current cost ($f_j$) for using an IPSG node (j) 206.

At step 504, dynamic tunnel connection costs ($C_{C1}$) are formulated as between the MAPs ($p_i$ of FIG. 4) and IPSGs ($q_j$ of FIG. 4). Further, at step 506, static tunnel connection costs ($C_{C2}$) are formulated as between the IPSGs ($q_j$ of FIG. 4) and the CPEs ($r_k$ of FIG. 4).

In particular, connection cost may be considered in terms of VPN tunnels. For every session from a user of a customer to a CPE, a VPN tunnel is established from a MAP to an IPSG. The VPN tunnel from a MAP to an IPSG is referred to as a "dynamic tunnel", since the VPN tunnel is typically established by a user "on-the-fly". However, the traffic from the IPSG to the CPE will be aggregated over one tunnel, termed a "static tunnel". In this instance, the cost from an IPSG to a CPE is included in the overall connection cost only once. For purposes of clarity and understanding the invention, optimization and selection of the IPSGs is formulated for a single customer, and then generalized for multiple customers.

A service providers profits may be maximized by selecting optimal IPSGs to provision a given VPN customer. It is noted that profit ($G=\gamma R-C$) is the difference between weighted revenue ($\gamma R$) and cost (C), where revenue (R) for a customer is a fixed value if the customer can be provisioned and $\gamma$ is the relative weight on revenue compared to cost.

The cost has several components, and as discussed above, determining the best set of IPSGs to provision each customer includes factoring in the cost of links over which VPN tunnels are established, the cost of establishing a tunnel, the cost of provisioning a VPN customer on an IPSG, and redundancy in IPSG provisioning for fault tolerance. In other words, for every MAP i in P and every CPE k in R, an IPSG j in Q is selected to establish a unique dynamic tunnel between i and j, and a shared static tunnel between j and k, such that the profit is maximized.

Referring to FIG. 4, P is the set of all MAPs 208, Q is the set of all IPSGs 206, and R is the set of all CPEs 222 for a customer. The binary variable $x_{ijk}\in\{0,1\}$ denotes whether a dynamic tunnel between node $i\in P$ and node $j\in Q$ is used for the traffic from MAP i to CPE $k\in R$. The binary variable $z_{jk}\in\{0,1\}$ denotes whether a shared static tunnel from IPSG j to CPE k is established. Here the cost of sending traffic from node i to node j is $c_{ij}$, and the cost of sending traffic from node j to node k is $d_{jk}$.

For a single customer, the dynamic tunnel connection cost (which is illustratively the hop count cost between the MAPs and the IPSGs) is $$C_{C1} = \sum_{i\in P, j\in Q, k\in R} c_{ij}x_{ijk}.$$

Similarly, the static tunnel connection cost (which is illustratively the hop count cost between the IPSGs and the CPEs) is $$C_{C2} = \sum_{j\in Q, k\in R} d_{ij}z_{jk}.$$

At step 508, the total tunnel connection cost ($C_C$) is formulated. The total connection cost is the sum of the dynamic tunnel connection cost and the static tunnel connection cost $C_C=C_C+\beta C_{C2}$, where $\beta$ is the relative weight on the static tunnel connection cost. Factors influencing the relative weight $\beta$ on the static tunnel connection cost include the cost of transporting data over core network over the cost over access network.

At step 510, the current cost $C_V$ of provisioning a IPSG node (j) is formulated. The binary variable $y_j\in\{0,1\}$ is 1 if IPSG j is provisioned for the customer to send traffic to at least one of its CPEs, and it is 0 otherwise. The parameter $f_j$ is illustratively used as the current cost of using IPSG node j. For a given customer, at most one provision is considered at any IPSG. Therefore $f_j$ has a fixed value when only one customer is considered at a time, and the provisioning cost is $$C_V = \sum_{j\in Q} f_j y_j.$$

At step 512, the total cost for the customer is formulated. In particular, the total cost is $C=C_C+\alpha C_V$ where $\alpha$ is the relative weight on the provision cost. Factors influencing the relative weight a on the provision cost include the importance of provision costs over connection costs for the network service provider.

At step 514, the profit is formulated. In particular, the profit is $G=\gamma R-C$. For simplicity, revenue $R=1$. Therefore, the profit "G" for provisioning the customer is $G=\gamma-C$, where $\gamma$ is the relative weight on revenue compared to total cost. The weighting factor $\gamma$ essentially allows the network service provider to adjust price based on the total cost for the customer.

At step 516, given parameters $c_{ij}$, $d_{jk}$ $f_j$, $\alpha$, $\beta$, and $\gamma$, binary variables $x_{ijk}$, $z_{jk}$ and $y_j$ are determined as the solution to the optimization problem formulation expressed as:

$$\max G=\gamma-C, \quad (1)$$

where $$C=(C_{C1}+\beta C_{C2})+\alpha C_V \quad (2)$$

$$C = \left(\sum_{i\in P, j\in Q, k\in R} c_{ij}x_{ijk} + \beta \sum_{j\in Q, k\in R} d_{jk}z_{jk}\right) + \alpha \sum_{j\in Q} f_j y_j \quad (3)$$

$$x_{ijk}\in\{0,1\}, \forall i\in P, \forall j\in Q, \forall k\in R \quad (4)$$

$$x_{jk}\in\{0,1\}, \forall j\in Q, \forall k\in R \quad (5)$$

$$y_j\in\{0,1\}, \forall j\in Q \quad (6)$$

$$\sum_{j \in Q} x_{ijk} = 1, \forall\, i \in P, \forall\, k \in R \qquad (7)$$

$$x_{ijk} \leq z_{jk}, \forall i \in P, \forall j \in Q, \forall k \in R \qquad (8)$$

$$z_{jk} \leq y_j, \forall j \in Q, \forall k \in R \qquad (9)$$

It is noted that equation (3) is an expanded version of equation (2). It is further noted that equation (7) specifies that exactly one link out of a MAP is chosen to go to one CPE, thereby implying that traffic from a MAP to a CPE is sent to only one IPSG. Equation (8) specifies a condition that only one tunnel is established between an IPSG and a CPE, even if traffic from multiple MAPs are going through the IPSG to reach the CPE. That is:

$$z_{jk} = 1, \text{ if } \sum_{i \in P} x_{ijk} > 0, \forall\, j \in Q, \forall\, k \in R \qquad (10)$$

$$z_{jk} = 0 \text{ otherwise.} \qquad (11)$$

Equations (10) and (11) are equivalent to condition (8), since $z_{jk}$ is in the objective function G, and when $x_{ijk}=0$, $\forall i \in P$, to maximize G, $z_{jk}=0$ must be chosen.

The condition expressed in equation (9) specifies that even if an IPSG is provisioned to send traffic to more than one CPE, for the purpose of computing provision cost, it should be considered as only one provision. That is, $$y_j = 1, \text{ if } \sum_{k \in R} z_{jk} > 0, \forall\, j \in Q \qquad (12)$$

$$y_j = 0 \text{ otherwise.} \qquad (13)$$

Equations (12) and (13) are equivalent to the condition expressed in equation (9), since $y_j$ is in the objective function G, and when $z_{jk}=0$, $\forall k \in R$, to maximize G, $y_j=0$ must be chosen. At step 599, the method 500 ends.

Once the provisioning costs are determined, the profit G for provisioning a customer with a particular subset of IPSGs may be computed. Specifically, profit equals revenues less provisioning costs G=λ−C. In other words, the connectivity between the mobile node 230 and CPE 222 may be optimized, since the sum of the costs between the nodes (i.e., hop count) and the cost of provisioning IPSGs is minimized by provisioning a particular subset of IPSG 206 for a customer 220.

In the multiple customer case, the sum of the profit for each customer is maximized, where the profit for each customer is calculated exactly the same way as in the single customer case discussed above. All MAPs 208 and IPSGs 206 in the network are shared among all customers. However, each customer has its distinct set of CPEs.

In the single customer case, the provision cost $f_j$ at each IPSG j has a fixed value, and an IPSG that has reached its provision capacity is not considered, which is equivalent to setting $f_j=\infty$. When multiple customers are considered, $f_j$ is assigned a fixed value for all customers provisioned on IPSG j, however, because multiple customers can be provisioned at each IPSG, care must be taken to ensure that the number of customers provisioned does not exceed the provision capacity of each IPSG. Moreover, when multiple customers are considered at the same time, not every customer should be provisioned in the network. Priorities should be given to customers providing maximum profit. There are two cases where a customer is rejected. One case is when there is no more provision capacity left on any IPSG in the network, the other case is when provisioning this customer results in negative profit, meaning a loss. Essentially to maximize the total profit a subset of the customers are provisioned. The rest of the customers are rejected because either the provision capacity is reached or they produce a loss instead of profit.

The optimization problem for multiple VPN customers can be described as follows. Let T be the set of VPN customers to consider and |T|=L. Let P be the set of all MAPs, Q be the set of all IPSGs, and R be the set of all CPEs for all customers where R={$R_1, R_2, \ldots, R_l, \ldots, R_L$} and $R_l$ is the set of CPEs for customer l∈T. Let $w^l$ be the binary variable specifying if customer/should be provisioned in the network. For each customer/provisioned, every node i in P and every node k in $R_l$, choose an IPSG node j in Q, to establish a unique tunnel between i and j, and a shared tunnel between j and k, such that the total profit for all customers is maximized. Needless to say, for a customer not provisioned, the cost is 0.

Figure 6:
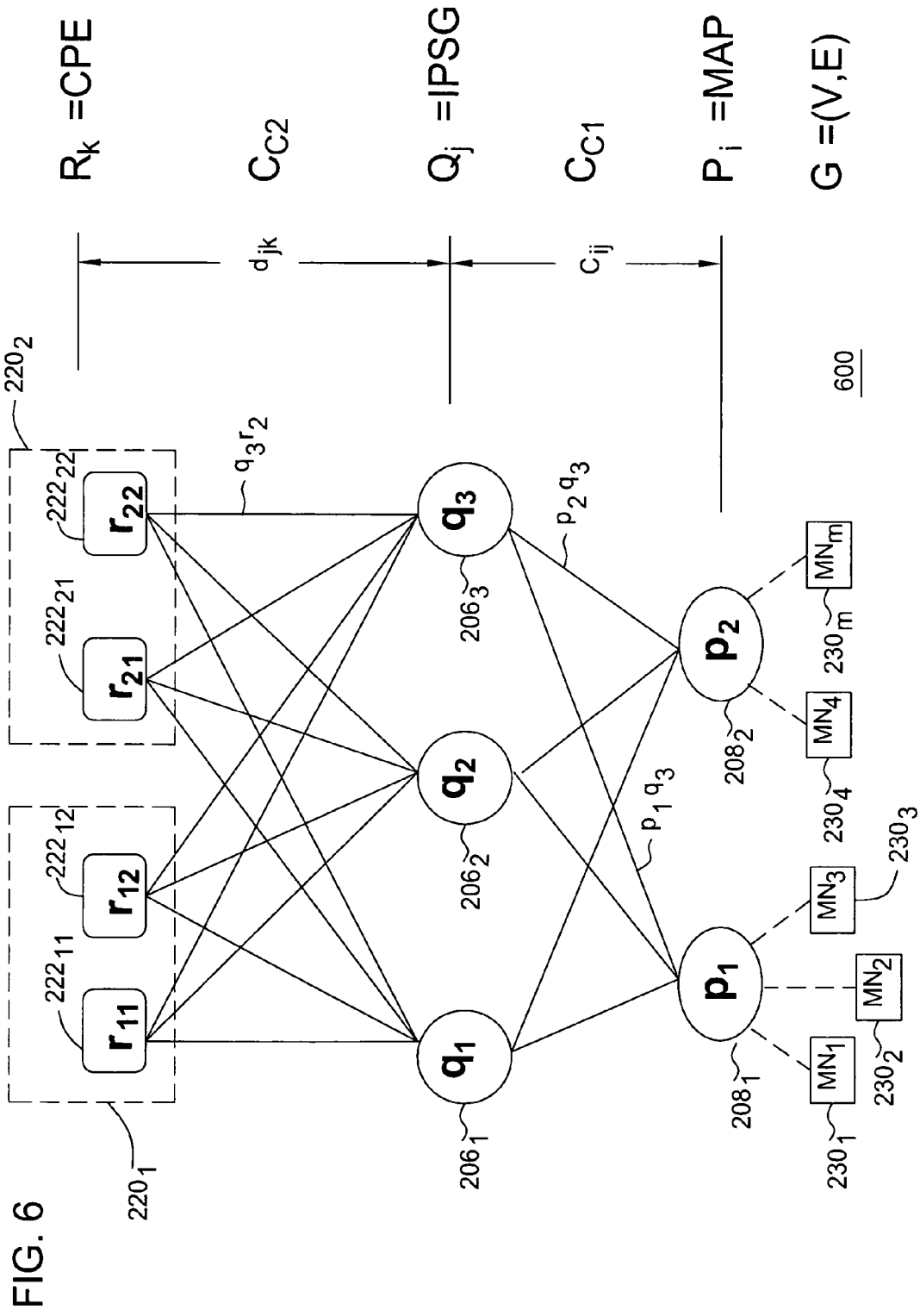
FIG. 6 depicts a schematic diagram of a second undirected graph for multiple customers.

FIG. 6 depicts a schematic diagram of a second undirected graph 600 for multiple customers. FIG. 6 is the same as FIG. 4, except that two customers 220 are illustratively shown, each having two CPEs. In particular, the network 600 illustratively comprises "i" MAPs 208, "j" IPSGs 206, and "k" CPEs 222 for a given customer, respectively denoted by $p_i$, $q_j$, and $r_k$. In the exemplary graph 600 of FIG. 6, the network 600 comprises two MAPs $208_1$ and $208_2$ denoted $p_1$ and $p_2$, three IPSGs $206_1$, $206_2$, and $206_3$ denoted $q_1$, $q_2$, and $q_3$ in the network 400, and a two customers $220_1$ and $220_2$. Each customer illustratively has two CPEs, such as CPE $222_{11}$ and $222_{12}$ denoted $r_{11}$ and $r_{12}$ for a first customer $220_1$, and CPE $222_{21}$ and $222_{22}$ denoted $r_{21}$ and $r_{22}$ for a second customer $220_2$. Furthermore, a plurality of mobile nodes $230_m$ is illustratively shown coupled to the MAPs 208. Specifically, $MN_1$ $230_1$ through $MN_3$ $230_3$ have connectivity to MAP $P_1$ $208_1$, while $MN_4$ $230_4$ and $MN_m$ $230_m$ have connectivity to MAP $P_2$ $208_2$.

For customer l∈T, we denote by the binary variable $x_{ijk}^l \in \{0,1\}$ whether a tunnel between node i∈P and node j∈Q is used for the traffic from MAP i to CPE k∈$R_l$. We use binary variable $z_{jk}^l \in \{0,1\}$ to denote whether a shared tunnel from IPSG j to CPE k is established. The cost of sending traffic from node i to node j is $c_{ij}$. Notice that the cost is the same for all customers, and therefore index l is not needed. The cost of sending traffic from node j to node k is $d_{jk}^l$.

The binary variables $y_j^l \{0,1\}$ is 1 if IPSG j is provisioned for customer l to send traffic to at least one of its CPEs, and it is 0 otherwise. We use parameter $P_{CAP}$ as the maximum number of customers that can be provisioned on each IPSG, and parameter $f_j$ as the cost for customer l to use node j. As long as the provision capacity of IPSG j has not been reached, the provision cost for each customer is the same, and therefore index l is not needed.

For a single customer l∈T under consideration, the dynamic tunnel connection cost (which is the cost from MAPs to IPSGs) is $C_{C1}^l = \Sigma_{i \in P, j \in Q, k \in R_l} c_{ij} x_{ijk}^l$. The shared static tunnel connection cost (which is the cost from IPSGs to MAPS) is $C_{C2}^l = \Sigma_{j \in Q, k \in R_l} d_{jk}^l z_{jk}^l$. The total connection cost is therefore, $C_C^l = C_{C1}^l + \beta C_{C2}^l$, where β is the relative weight on static tunnel connection cost. The provisioning cost for customer l is $C_V^l = \Sigma_{j \in Q} f_j y_j^l$. Thus, the total cost for customer l is $C^l = C_C^l + \alpha C_V^l$ where α is the relative weight on the provision cost. The revenue for each customer provisioned is assumed to be the same. Accordingly, both the revenue and cost are zero for each customer not provisioned. The profit is therefore $G^l=\gamma w^l - C^l$ where $\gamma$ is the relative weight on revenue compared to cost. The optimization problem formulation can then be specified as $$\max G = \sum_{l \in T} G^l \quad (14)$$

where $$G^l = \gamma w^l - C^l, \forall l \in T \quad (15)$$

$$C^l = (C^l_{C1} + \beta C^l_{C2}) + \alpha C^l_V \quad (16)$$

$$C^l = \left( \sum_{i \in P, j \in Q, k \in R_l} c_{ij} x^l_{ijk} + \beta \sum_{j \in Q, k \in R_l} d^l_{jk} z^l_{jk} \right) + \alpha \sum_{j \in Q} f_j y^l_j \quad (17)$$

$$w^l \in \{0,1\}, \forall l \in T \quad (18)$$

$$x_{ijk}^l \in \{0,1\} \forall l \in T, \forall i \in P, \forall j \in Q, \forall k \in R_l \quad (19)$$

$$z^l_{jk} \in \{0,1\} \forall l \in T, \forall j \in Q, \forall k \in R_l \quad (20)$$

$$y^l_j \in \{0,1\} \forall l \in T, \forall j \in Q \quad (21)$$

$$\sum_{j \in Q} x^l_{ijk} = w^l, \forall l \in T, \forall i \in P, \forall k \in R_l \quad (22)$$

$$x_{ijk}^l \leq z^l_{jk}, \forall l \in T, \forall i \in P, \forall j \in Q, \forall k \in R_l \quad (23)$$

$$z^l_{jk} \leq y^l_j, \forall l \in T, \forall j \in Q, \forall k \in R_l \quad (24)$$

$$\sum_{l \in T} y^l_j \leq P_{cap}, \forall j \in Q \quad (25)$$

It is noted that equation (17) is an expanded version of equation (16). Compared with the formulation for a single customer, condition (25) is added to specify that the total number of provisions on each IPSG j cannot exceed its capacity $P_{CAP}$. Moreover, a new binary variable $w^l$ is introduced to specify if a customer is provisioned, and Condition (22) is modified to specify that only when a customer is provisioned, exactly one link out of a MAP is chosen to go to one CPE for this customer, otherwise no link out of any MAP is chosen and no IPSG is provisioned.

In order to solve the integer-programming problem discussed above, connection costs $c_{ij}$, $d_{jk}$ and provision cost $f_j$ need to be assigned appropriate values. The cost computation can be adapted to fit the NSP's design objectives. This makes the above formulation quite general and can be used for different scenarios in addition to guaranteeing connectivity for VPN customers.

Connection cost is a function of the parameters that the NSP wants to control. A NSP 204 may need to satisfy a special requirement from a VPN customer 220, such that the users of this customer are not switched to a remote lightly loaded IPSG 206, even if that reduces the total cost for the NSP 204. For example, an MN 230 on the east coast trying to access corporate intranet on the east coast should not be switched to an IPSG on the west coast even if the total cost is minimized with this solution. To take the constraint into account, we restrict the number of hops allowed from a MAP to a CPE and the link cost of the graph is modified as:

$$c_{ij}=\infty, \text{ if } c_{ij}>L1_{max}, \forall i \in P, \text{ and } \forall j \in Q \quad (26)$$

$$d_{jk}=\infty, \text{ if } d^l_{jk}>L2_{max}, \forall j \in Q, \forall k \in R, \text{ and } \forall l \in T \quad (27)$$

where $L1_{max}$ and $L2_{max}$ are the maximum number of hops allowed for the tunnel between a MAP 208 and a IPSG 206 and the tunnel between the IPSG 208 and a CPE 222, respectively.

When a single customer is considered at a time, the provision cost may be optionally set to reflect the existing number of provisions at each IPSG. For example, the provisioning cost $f_j=cap_j/avail_j$, where $cap_j$ is the capacity of IPSG j and $avalj_i$ is the number of available provisions left. This cost assignment will result in even distribution of the number of provisions per IPSG across all IPSGs 206.

However, when multiple customers are considered at the same time, the provision cost for different customers has to be the same to be a valid input to the integer-programming program. Without loss of generality, we set $f_j=1$ for IPSG j for all customers.

The cost computation phase accounts for customer specific requirements. After the cost computation phase, conventional integer programming packages (e.g., LPSOLVE and CPLEX) may be used to solve the IPSG selection problem.

Fault tolerance may be provided to ensure that if a tunneling IPSG fails, at least second IPSG is available to provide redundancy. In one embodiment, a minimum bound is placed on the replication. In order to provide fault tolerance, for every customer, each traffic session from a MAP to a CPE should have the option of going through N>1 IPSGs. In case N−1 IPSGs fail, traffic sessions can still be established using the functioning IPSG. The only modification to the formulation provided in condition (22) without fault tolerance consideration, is to substitute Condition (22) with $$\sum_{j \in Q} x^l_{ijk} = Nw^l, \forall l \in T, \forall i \in P, \forall k \in R_l \quad (28)$$

Condition (28) specifies for each customer $l \in T$ that is provisioned, there must be N connections established between a MAP 208 and a CPE 222 each going through a separate IPSG 206. Because each pair of MAP and CPE requires the use of a set of N IPSGs, and these IPSG sets can overlap, therefore the total number of IPSGs used for customer l is greater than or equal to N. In other words, this formulation specifies the minimum number of IPSGs provisioned for each customer.

In a second embodiment, an exact bound is placed on the replication. Another way to consider fault tolerance is to require that each customer can only use exactly N IPSGs for all its connections. This would require one more condition to be added to the formulation as follows:

$$\sum_{j \in Q} y^l_j = Nw^l, \forall l \in T \quad (29)$$

Condition (29) specifies exactly N IPSG nodes can be used for all the connections for a provisioned customer l.

Accordingly, a hierarchical architecture using two network elements, namely the MAPs 208 and IPSGs 206, has been illustratively shown to provide mobile VPN services. In order to optimally use the network elements, several costs have been identified, which influence the designing of the network. In particular, in one embodiment, the IPSGs are provisioned for mobile VPN customers in order to minimize the total connection cost of links over which VPN tunnels are established, as well as the cost of provisioning IPSGs for each customer.

That is, multiple customers of the NSP may be optimally provisioned onto different IPSGs 206 in order to maximize the profit for an NSP that provides mobile-VPN services. Such optimization takes into account the cost of links over which the VPN sessions are established and the cost of provisioning customers on the IPSGs 206.

In a second embodiment of the invention, the VPN customers may be optimally provisioned onto different IPSGs 206 in a bandwidth limited network. In particular, using the same architecture described above with respect to FIGS. 1-6, maximizing the NSPs profit may be determined based on bandwidth constraints of the network. Such determination of maximizing the NSPs profitability takes into account the bandwidth requirements of the customers, the cost of allocating the required bandwidth, the capacity restraints of the links, and the cost of provisioning the customers on the IPSGs, as discussed below with respect to FIGS. 7-9.

Specifically, mobile users belonging to enterprise customers of the NSP initiate data connectivity with a MAP 208 that covers the region where that user is located. These users then initiate VPN sessions (i.e., tunnels) with a specific CPE 222 that is located at one of the customer locations. As discussed above, these sessions are initiated via dynamic VPN tunnels by a user when secure connectivity to the enterprise is required, and torn down when the user does not have this requirement anymore. These VPN session requests are forwarded by the corresponding MAPs 208 to an IPSG 206 that has been provisioned for that customer. The IPSGs 206 terminate these VPN sessions, and forward traffic from/to these sessions to the appropriate CPE 222 over static VPN tunnels (i.e., long-lived pre-initiated VPN sessions) from the IPSGs 206 to the CPEs 222. This means, for every VPN session from a MN 230 of a customer to a CPE 222, a dynamic tunnel is established by the MN 230 through the corresponding MAP 208 to an IPSG 206. However, the traffic from the IPSG 206 to the CPE 222 will be aggregated over one static tunnel. In between, the IPSGs provide value-added services to the traffic forwarded between pairs of dynamic and static tunnels. As discussed above with respect to the hierarchical architecture, each customer is provisioned only within a subset of IPSGs, and only those IPSGs can provide Mobile-VPN services to the users of the customer.

In this scenario, an IPSG 206 provisioning problem in bandwidth constrained networks may be defined as follows. Consider a specific Mobile-VPN customer. The NSP realizes a certain amount of revenue by providing Mobile-VPN services to the users of this customer. However, there is also a cost associated with providing this service. With respect to this customer, the problem to be solved for by the NSP is (a) select a subset of IPSGs to provision for this customer, and (b) for each MAP 208, determine how much of the traffic that arrives at the MAP 208 from users of this customer should be redirected to each of the IPSGs 206 in this subset, under the constraint that the network bandwidth capacity is limited. The objective is to find a solution to problems (a) and (b) such that the profit (revenue minus cost) obtained by the NSP by providing Mobile-VPN service is maximized. The more general problem is to find a solution such that the total profit obtained by the NSP by providing Mobile-VPN services to all customers is maximized.

For purposes of understanding the invention, it is assumed that the NSP realizes a fixed amount of revenue from a customer by providing Mobile-VPN service. The cost associated with providing the service can be enumerated as (i) a fixed cost associated with provisioning a customer on an IPSG 206, which is referred to as the provision cost; and (ii) a variable cost associated with sending traffic from/to a MAP 208 to/from an IPSG 206 over dynamic tunnels and from/to an IPSG 206 to/from a CPE 222 over static tunnels, which is a function of the amount of traffic (in units/sec, e.g., Mbits/sec) sent (i.e., bandwidth costs).

Logical links that connect MAPs 208 to IPSGs 206 and IPSGs 206 to the CPEs 222 have a certain capacity (in units/sec (e.g., Mbits/sec)). The traffic that is sent by a MAP to an IPSG and similarly by an IPSG to a CPE cannot exceed the underlying link capacity. A logical link is assumed to represent a set of physical links that provide a path between the corresponding pair of elements (i.e., nodes). Additionally, each IPSG is limited to a certain number of provisions that it can handle in terms of the number of customers. This is because of the resources that an IPSG has to reserve for each of the customers.

It is further assumed that the MAPs and IPSGs are already deployed by the NSP and their numbers and locations are chosen during the network planning process. It is also assumed that the NSP provides network connectivity so that any MAP 208 can reach any IPSG 206, and any IPSG 206 can reach any CPE 222. The capacity on the (logical) link between a MAP 208 and an IPSG 206, and similarly between an IPSG 206 and a CPE 222 is normally determined by the bottleneck physical link on the path between the pairs of elements. It is assumed that this capacity information is available to the NSP a priori.

Additionally, it is assumed that MNs 230 are identified using the popular methods of Network Access Identifier (NAI) and/or Access Point Name (APN). A MAP 208 extracts the NAI/APN of the MN during data connection setup time with the MN. From the NAI/APN, it can then identify the destination CPE 222, if there is only one CPE. If there is more than one CPE 222, the MAP 208 can determine the MN's preferred CPE from an Authentication, Authorization and Accounting (AAA) server (not shown). When a MAP 208 redirects a VPN session request from a MN 230 to an IPSG 206, a dynamic tunnel is established between the MN and the IPSG. At this point, the IPSG 206 is aware of the CPE 222 that the MN 230 wants to connect to. From this point on, whenever traffic is received on the dynamic tunnel from the MN 230, the IPSG 206 will forward it through the static tunnel towards that CPE 222. Thus, data connectivity is established end-to-end between a MN 230 and a CPE 222. In steady state, it is assumed that the NSP has an estimate of how much bandwidth is needed to service all the users (MNs) of a customer that establish data connectivity at a MAP and send traffic to a specific CPE.

Figure 7:
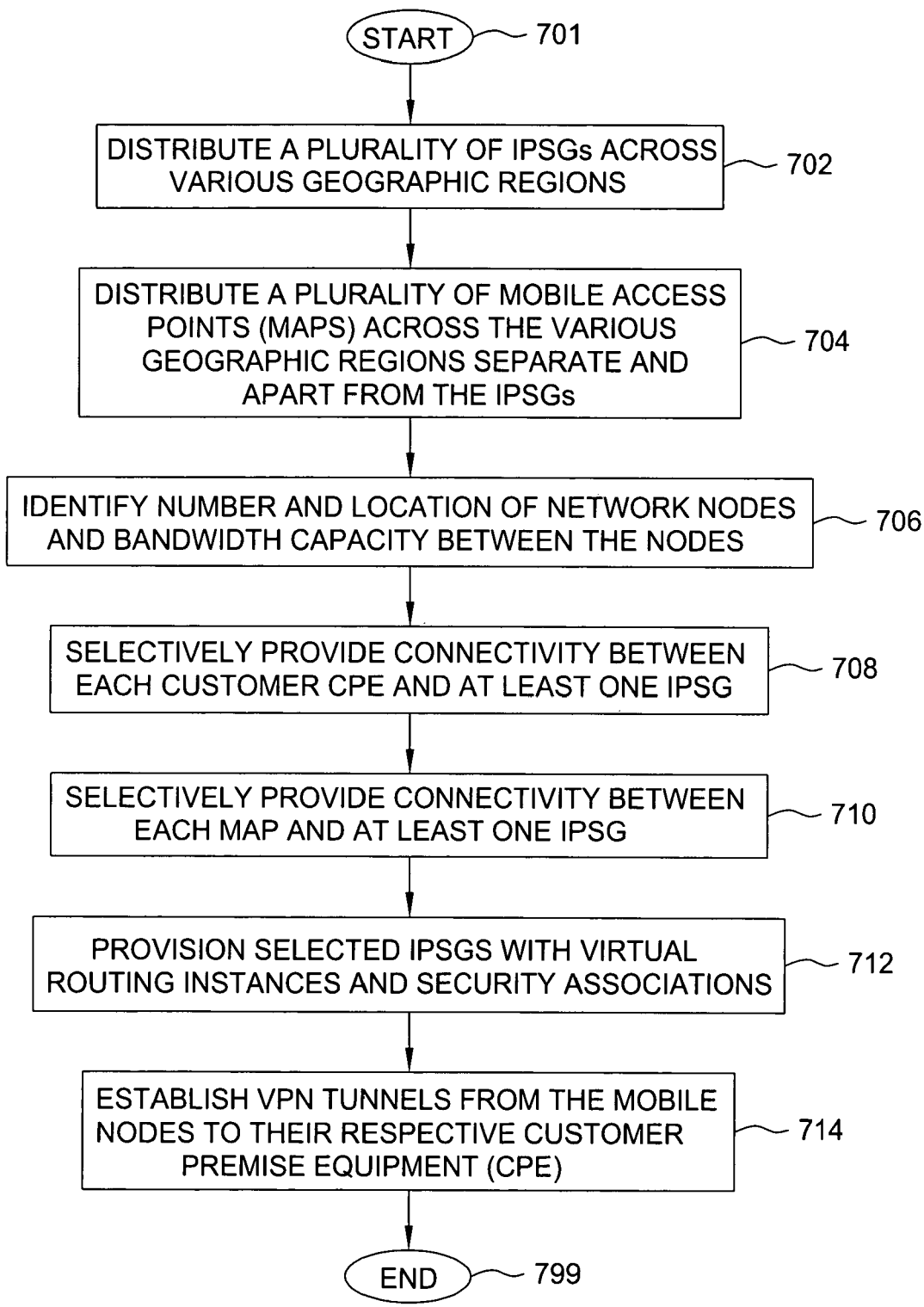
FIG. 7 depicts a flow diagram of a method for providing virtual private network (VPN) services based on bandwidth constraints.

FIG. 7 depicts a flow diagram of a method 700 for providing virtual private network (VPN) services based on bandwidth constraints. FIG. 7 should be viewed in conjunction with FIGS. 2, 4, and 6. The method 700 begins at step 701, and proceeds to step 702, a network service provider (NSP) 201 strategically distributes a plurality of IPSGs 206 across various geographic regions, such as, for example, in various parts of a large city, across a state, and/or nationwide.

When an enterprise customer signs up for the VPN service, it provides the NSP the location of its CPEs. The NSP can process customer requests in two ways. In the simple approach, it can process customer requests one at a time, as discussed below with respect to FIG. 8. This approach will achieve local optimal, however, it cannot guarantee global optimal. That is, it cannot guarantee all customers are optimally provisioned to maximize the profit for NSP. The other approach is to consider multiple customers at a time, as discussed below with respect to FIG. 9. Since the formulation with multiple customers achieves global optimal, and the single customer formulation is considered a special case of the multi-customer approach.

At step 704, the NSP 201 distributes a plurality of mobile access points (MAPs) 208 across the various geographic regions, such that the MAPs 208 are located separate and apart (i.e., remote) from the IPSGs 206, as discussed above with respect to steps 302 and 304 of FIG. 3.

The method 700 then proceeds to step 706, where the number and location of network nodes are identified. When the NSP 201 deploys the nodes in the network, the number and location of each IPSG 206 and MAP 208 are identified, as well as the number of customers and their respective intranets 220 and CPEs 222 are identified. Also identified is the bandwidth capacity between the nodes, such that the end-to-end bandwidth capacity may be determined from a MN 230 to a CPE 222. It is noted that the connectivity between nodes may be the shortest path based on hop counts, or the lowest-cost path based on the cost assigned to network links, both of which can be computed by open shortest path first (OSPF). Once the nodes and bandwidth capacity between the nodes have been identified, the method 700 proceeds to step 308.

At step 708, the NSP 201 selectively provides connectivity between each customer 220 (i.e., CPE 222) and at least one IPSG 206. That is, a determination is made to resolve particular subsets of IPSGs 206 to be provisioned for a particular customer. Selecting a subset of the plurality of IPSGs 206 to serve selected customers 220 is based on a cost analysis algorithm, which is discussed below in further detail with respect to FIG. 8. Once connectivity is provided between each customer CPE 222 and the at least one IPSG 206, the method 700 proceeds to step 710. At step 710, the NSP 201 selectively provides connectivity between each MAP 208 and at least one IPSG 206. Selection of the IPSGs 206 to support the MAPs 208 is also based on cost analysis, which is also discussed below in further detail with respect to FIG. 8. The method 700 then proceeds to step 712.

At step 712, the selected IPSGs 206 are provisioned with virtual routing instances and security associations for the customer. At step 714, the provisioned IPSGs 206 are used to establish VPN tunnels to the corresponding CPEs 222 of the customer. In particular, VPN tunnels may be established from the mobile nodes 230 to their respective CPE 222 via a MAP 208 serving the mobile node 230 and a customer specific IPSG 206. The method 700 then proceeds to step 799, where method 700 ends, and the users may participate in a VPN session.

Referring to FIG. 4, the network of IPSGs 206, MAPs 208, and the customer's CPEs 222 is again modeled as an undirected graph G=(V,E,) where V is the set of nodes and E is the set of links, as discussed above. In particular, FIG. 4 shows an example graph model for a customer. There are two MAPs, $p_1$ and $p_2$, three IPSGs, $q_1$, $q_2$, and $q_3$ in the network, and two CPEs $r_1$ and $r_2$ for the customer. Graph nodes in V correspond to CPEs 222, IPSGs 206, and MAPs 208. Graph links in E fall in the following two categories: (1) a link between a MAP and an IPSG corresponds to a logical link between the MAP and the IPSG, and (2) a link between an IPSG 206 and a CPE 222 corresponds to a logical link between the IPSG and the CPE. As mentioned above, a logical link represents a set of physical links that form a path between the corresponding elements. This path could be the shortest path based on hop counts, or the lowest-cost path based on the cost assigned to network links, both of which can be computed by OSPF. It could also be a traffic-engineered path such as an ATM, VC, an MPLS Label Switched Path, and the like.

The capacity of a link is the capacity of the bottleneck physical link on the path that corresponds to this link. In the hierarchical architecture, traffic flows from MNs 230 to CPEs 222 through the MAPs 208 and IPSGs 206. Therefore, only links between MAPs 208 and IPSGs 206 and between IPSGs 206 and CPEs 222 are considered in the model. It is assumed that there are I MAPs, J IPSGs in the network and K CPEs for a given customer, denoted by $p_i$, $q_j$, and $r_k$, respectively.

Based on the above model, a solution to the IPSG provisioning problem may be determined by considering a set of Mobile-VPN customers and (a) computing the best set of IPSGs 206 to provision for each of the customers, and (b) determining how the flow of traffic (in terms of units/sec) for a customer, received at a MAP 208 destined to a specific CPE, will be split and sent to the set of IPSGs 206 on which the customer has been provisioned. The solution is first formulated for a single customer as discussed below with respect to FIG. 8. The solution is then extended to incorporate multiple customers, as discussed below with respect to FIG. 9.

Referring to FIG. 7, at step 708, a subset of the IPSGs 206 is selected for each customer. The establishment of a VPN tunnel over a physical network link incurs a certain cost associated with the link. In this second embodiment, the cost of a link between two nodes in the graph then becomes the computed cost of the VPN tunnel between the corresponding network nodes. In this second embodiment, the link costs are associated with a fraction of the bandwidth capacity of the physical links, as opposed to the number of hops in the underlying physical network, as discussed with respect to the first embodiment of FIGS. 1-6. Thus, the link costs are discussed in terms of bandwidth capacity of a physical link.

Since only one VPN tunnel is established between an IPSG and a CPE for the same customer, the cost of a link from an IPSG to a CPE is considered only once for each customer. For example, referring to FIG. 4, IPSG $q_3$ $206_3$ may have two tunnels formed from MAPs $p_1$ $208_1$ and $p_2$ $208_2$ via respective links $p_1q_3$ and $p_2q_3$. However, only one shared tunnel is utilized between the IPSG $q_3$ $206_3$ and CPE $r_2$ $222_2$ for those MNs connecting to CPE $r_2$ $222_2$.

Figure 8:
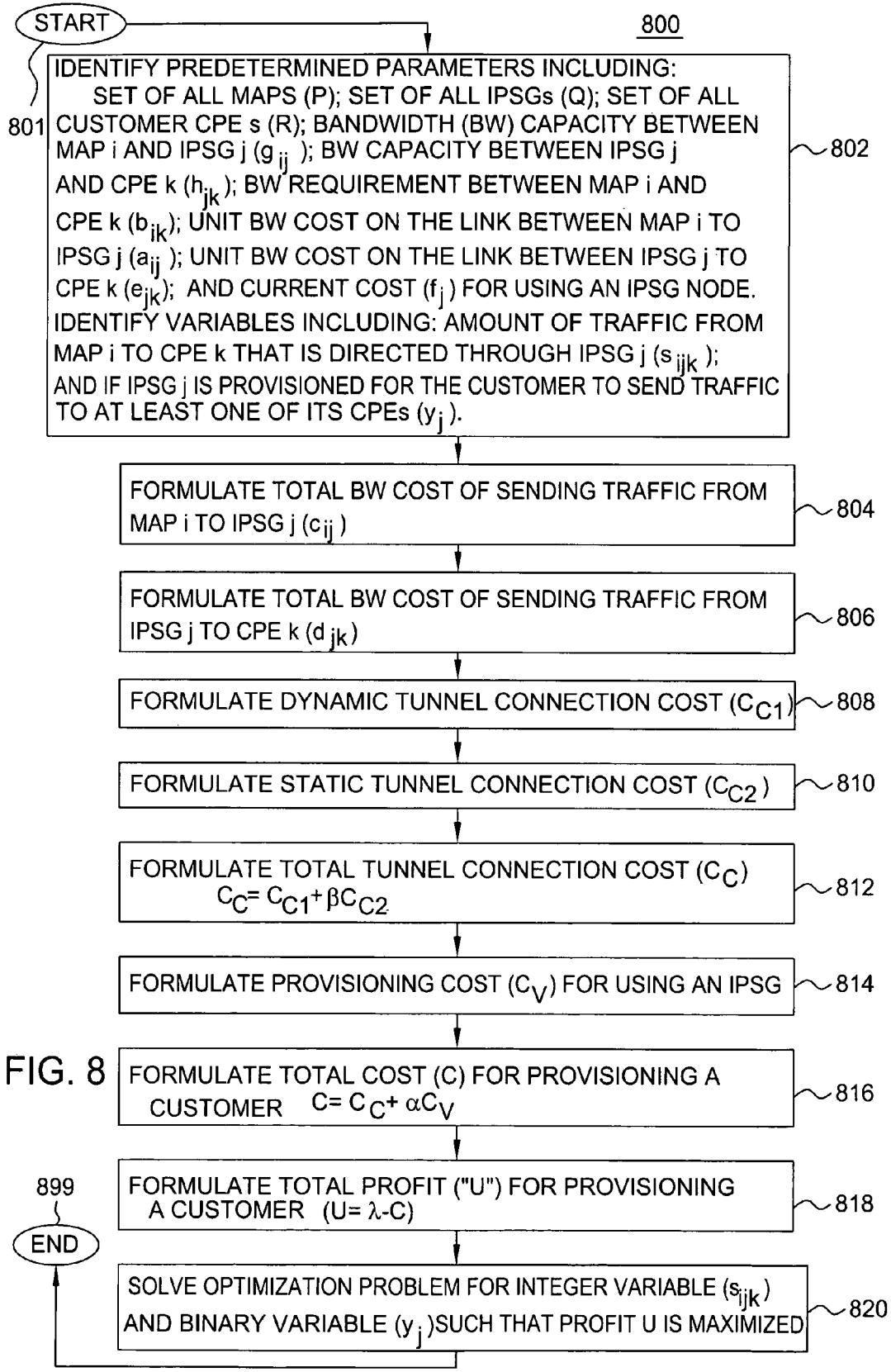
FIG. 8 depicts a flow diagram of a method suitable for selecting a subset of IP service gateways (IPSGs) to provision a single VPN customer based on bandwidth capacity in accordance with the method of FIG. 7.

FIG. 8 depicts a flow diagram of a method 800 suitable for selecting a subset of IP service gateways (IPSGs) to provision a single VPN customer based on bandwidth capacity in accordance with the method 700 of FIG. 7. FIG. 8 should be viewed in conjunction with FIG. 4. Method 800 starts at step 801, and proceeds to step 802, where predetermined network parameters are identified. In particular, the predetermined network parameters include a set of all MAPs (P), a set of all IPSGs (Q), a set of all customer CPE (R), the bandwidth capacity between MAP i and IPSG j ($g_{ij}$), the bandwidth capacity between IPSG j and CPE k ($h_{jk}$), the bandwidth requirement between MAP i and CPE k ($b_{ik}$), the unit bandwidth cost on the link between MAP i to IPSG j ($a_{ij}$), the unit bandwidth cost on the link between IPSG j to CPE k ($e_{jk}$), current cost ($f_j$) for using an IPSG node.

Additionally at step 802, integer and binary variables are identified. The integer variable ($s_{ijk}$) is used to specify the amount of traffic from MAP i to CPE k that is directed through IPSG j, and the binary variable $y_j \in \{0,1\}$ specifies whether or not IPSG j is provisioned for the customer to send traffic to at least one of its CPEs.

In particular, Let P be the set of all MAPs, Q be the set of all IPSGs, and R be the set of all CPEs for the customer as shown in FIG. 4. The integer variable $s_{ijk}$ is used to specify the amount of traffic from MAP i∈P to CPE k∈R that is directed through IPSG j∈Q. It is assumed that the capacity on the link between MAP i∈P and IPSG j∈Q is $g_{ij}$ units/sec, the capacity of the link between IPSG j∈Q and CPE k∈R is $h_{jk}$ units/sec, and the bandwidth requirement for traffic from MAP i∈P to CPE k∈R is $b_{jk}$ units/sec, where units/sec may illustratively be Mbits/second or Mbytes/second. It is also assumed that the unit bandwidth cost (1 unit/sec) on the link from MAP i to IPSG j is $a_{ij}$, and the unit bandwidth cost on the link from IPSG j to CPE k is $e_{jk}$.

At step 804, the cost ($c_{ij}$) of sending traffic from each MAP 208 to each IPSG 206 is formulated for a single customer. In particular, the bandwidth requirement for traffic from MAP i∈P to IPSG j∈Q is $$\sum_{k \in R} s_{ijk}.$$

Therefore, the bandwidth cost between MAP i and IPSG j is $$c_{ij} = a_{ij} \sum_{k \in R} s_{ijk}.$$

Similarly, at step 806, the cost ($d_{jk}$) of sending traffic from each IPSG 206 to each CPE 222, and the current cost ($f_j$) for using an IPSG node (j) 206 is formulated for a single customer. In particular, the bandwidth requirement for traffic from IPSG j∈Q to CPE k∈R is $$\sum_{i \in P} s_{ijk}.$$

Therefore, the bandwidth cost between IPSG j and CPE k is $$d_{jk} = e_{jk} \sum_{i \in P} s_{ijk}.$$

At step 808, dynamic tunnel bandwidth costs ($C_{C1}$) are formulated as between the MAPs ($p_i$ of FIG. 4) and IPSGs ($q_j$ of FIG. 4). Specifically, the bandwidth cost of dynamic tunnels is $$C_{C1} = \sum_{i \in P, j \in Q} c_{ij} = \sum_{i \in P, j \in Q, k \in R} a_{ij} s_{ijk}.$$

Further, at step 810, static tunnel bandwidth costs ($C_{C2}$) are formulated as between the IPSGs ($q_j$ of FIG. 4) and the CPEs ($r_k$ of FIG. 4). Specifically, the bandwidth cost of static tunnels is $$C_{C2} = \sum_{j \in Q, k \in R} d_{jk} = \sum_{i \in P, j \in Q, k \in R} e_{jk} s_{ijk}.$$

A service provider's profits may be maximized by selecting optimal IPSGs to provision a given VPN customer. It is noted that profit (U=γR−C) is the difference between weighted revenue (γR) and cost (C), where revenue (R) for a customer is a fixed value if the customer can be provisioned and γ is the relative weight on revenue compared to cost.

The total cost has several components, and as discussed above, such as determining the best set of IPSGs to provision each customer, which includes factoring in the cost of links in terms of bandwidth over which VPN tunnels are established, the cost of establishing a tunnel, the cost of provisioning a VPN customer on an IPSG, and redundancy in IPSG provisioning for fault tolerance. In other words, for every MAP i in P and every CPE k in R, an IPSG j in Q is selected to establish a unique dynamic tunnel between i and j, and a shared static tunnel between j and k, such that the profit is maximized.

At step 812, the total tunnel bandwidth cost ($C_C$) is formulated. The total bandwidth cost is the sum of the dynamic tunnel bandwidth cost and the static tunnel bandwidth cost $C_C = C_{C1} + \beta C_{C2}$, where β is the relative weight on the bandwidth cost of the static tunnel. Factors influencing the relative weight B on the static tunnel bandwidth cost include the cost of transporting data over core network over the cost over access network. This is because the connection from IPSG to CPE is over the core network and the connection between MAP and IPSG is over the access network.

At step 814, the current cost $C_V$ of provisioning a IPSG node (j) is formulated. The binary variable $y_j \in \{0,1\}$ is 1 if IPSG j is provisioned for the customer to send traffic to at least one of its CPEs, and it is 0 otherwise. The parameter $f_j$ is illustratively used as the current cost of using IPSG node j. For a given customer, at most one provision is considered at any IPSG. Therefore $f_j$ has a fixed value when only one customer is considered at a time, and the provisioning cost is $$C_V = \sum_{j \in Q} f_j y_j.$$

At step 816, the total cost for the customer is formulated. In particular, the total cost is $C = C_C + \alpha C_V$, where α is the relative weight on the provision cost. Factors influencing the relative weight α on the provision cost include the importance of provision costs over bandwidth costs for the network service provider.

At step 818, the profit is formulated. In particular, the profit is U=γV−C. For simplicity, revenue V=1. Therefore, the profit "U" for provisioning the customer is U=γ−C, where γ is the relative weight on revenue compared to total cost. The weighting factor γ essentially allows the network service provider to adjust price based on the total cost for the customer.

At step 820, given parameters $g_{ij}$, $h_{jk}$, $b_{jk}$ $a_{ij}$, $e_{jk}$ $f_j$, α, β, and γ, integer variable $s_{ijk}$ and binary variable $y_j$ are determined as the solution to the optimization problem formulation expressed as:

$$\max U = \gamma - C, \tag{30}$$

where $$C = (C_{C1} + \beta C_{C2}) + \alpha C_V \tag{31}$$

$$C = \left( \sum_{i \in P, j \in Q} c_{ij} + \beta \sum_{j \in Q, k \in R} d_{jk} \right) + \alpha \sum_{j \in Q} f_j y_j \tag{32}$$

$$s_{ijk} \geq 0, \forall i \in P, \forall j \in Q, \forall k \in R \quad (33)$$

$$y_j \in \{0,1\}, \forall j \in Q \quad (34)$$

$$\sum_{j \in Q} s_{ijk} = b_{ik}, \forall i \in P, \forall k \in R \quad (35)$$

$$c_{ij} = a_{ij} \sum_{k \in R} s_{ijk}, \forall i \in P, \forall j \in Q \quad (36)$$

$$d_{jk} = e_{jk} \sum_{i \in P} s_{ijk}, \forall j \in Q, \forall k \in R \quad (37)$$

$$\sum_{k \in R} s_{ijk} \leq g_{ij}, \forall i \in P, \forall j \in Q \quad (38)$$

$$\sum_{i \in P} s_{ijk} \leq h_{jk}, \forall j \in Q, \forall k \in R \quad (39)$$

$$s_{ijk} \leq y_j b_{ik}, \forall i \in P, \forall j \in Q, \forall k \in R \quad (40)$$

It is noted that equation (32) is an expanded version of equation (31). It is further noted that equation (35) specifies that traffic for the customer at MAP i destined to CPE k could be split and forwarded through multiple IPSGs. Conditions (36) and (37) define the bandwidth cost of dynamic tunnel from MAP i to IPSG j, and static tunnel from IPSG j to CPE k, respectively. Conditions (38) and (39) specify the total bandwidth restrictions for dynamic tunnels and static tunnels, respectively. Further, equation (40) specifies a condition that even if an IPSG is provisioned to send traffic to more than one CPE, for the purpose of computing provision cost, it should be considered as only one provision. That is:

$$y_j = 1, \text{ if } \sum_{i \in P, k \in R} s_{ijk} > 0, \forall j \in Q \quad (41)$$

$$y_j = 0 \text{ otherwise.} \quad (42)$$

Equations (41) and (42) are equivalent to condition (40), since $b_{ik} \geq s_{ijk} \forall i \in P$, $j \in Q$, $k \in R$, and when $s_{ijk} > 0$, as long as $y_j = 1$, condition (40) is satisfied. In addition, since $y_j$ is in the objective function U, and when $s_{ijk} = 0$, $\forall i \in P$, $\forall k$ (P to maximize profit U, yj=0 must be chosen. At step 899, the method 800 ends.

Once the provisioning costs are determined, the profit U for provisioning a customer with a particular subset of IPSGs may be computed. Specifically, profit equals revenues less provisioning costs $U=\lambda-C$. In other words, the connectivity between the mobile node 230 and CPE 222 may be optimized, since the sum of the costs between the nodes (i.e., bandwidth constraints) and the cost of provisioning IPSGs is minimized by provisioning a particular subset of IPSG 206 for a customer 220.

In the multiple customer case, the sum of the profit for each customer is maximized, where the profit for each customer is calculated exactly the same way as in the single customer case discussed above. All MAPs 208 and IPSGs 206 in the network are shared among all customers. However, each customer has its distinct set of CPEs.

In the single customer case, the provision cost $f_j$ at each IPSG j has a fixed value, and an IPSG that has reached its provision capacity is not considered, which is equivalent to setting $f_j=\infty$. When multiple customers are considered, $f_j$ is assigned a fixed value for all customers provisioned on IPSG j, however, because multiple customers can be provisioned at each IPSG, care must be taken to ensure that the number of customers provisioned does not exceed the provision capacity (PCAP) of each IPSG. Moreover, when multiple customers are considered at the same time, not every customer should be provisioned in the network. Priorities should be given to customers providing maximum profit. There are three instances where a customer is rejected. One case is when there is no more provision capacity left on any IPSG in the network. Another instance occurs when the bandwidth requirement of the customer from one or more of the MAPs exceeds the network capacity, while the third other case occurs when provisioning a customer results in negative profit (i.e., a loss). Essentially, a subset of the customers is provisioned to maximize the total profit. The rest of the customers are rejected because either the provision capacity is reached or they produce a loss instead of profit.

Referring to FIG. 6, two customers 220 each having two CPEs 222 are shown, as opposed to the single customer shown in FIG. 4. The network 600 illustratively comprises "i" MAPs 208, "j" IPSGs 206, and "k" CPEs 222 for a given customer, respectively denoted by $p_i$, $q_j$, and $r_k$. Recall that the network 600 comprises two MAPs 208$_1$ and 208$_2$ denoted $p_1$ and $p_2$, three IPSGs 206$_1$, 206$_2$, and 206$_3$ denoted $q_1$, $q_2$, and $q_3$ in the network 600, and two customers 220$_1$ and 220$_2$. Each customer illustratively has two CPEs, such as CPE 222$_{11}$ and 222$_{12}$ denoted $r_{11}$ and $r_{12}$ for a first customer 220$_1$, and CPE 222$_{21}$ and 222$_{22}$ denoted $r_{21}$ and $r_{22}$ for a second customer 220$_2$. Furthermore, a plurality of mobile nodes 230$_m$ is illustratively shown coupled to the MAPs 208. Specifically, MN$_1$ 230$_1$ through MN$_3$ 230$_3$ have connectivity to MAP $p_1$ 208$_1$, while MN$_4$ 230$_4$ and MN$_m$ 230$_m$ have connectivity to MAP $p_2$ 208$_2$. For customer 1, the two CPEs are $r_{11}$ 222$_{11}$ and $r_{12}$ 222$_{12}$, and for customer 2, the two CPEs are $r_{21}$ 222$_{21}$ and $r_{22}$ 222$_{22}$.

Figure 9:
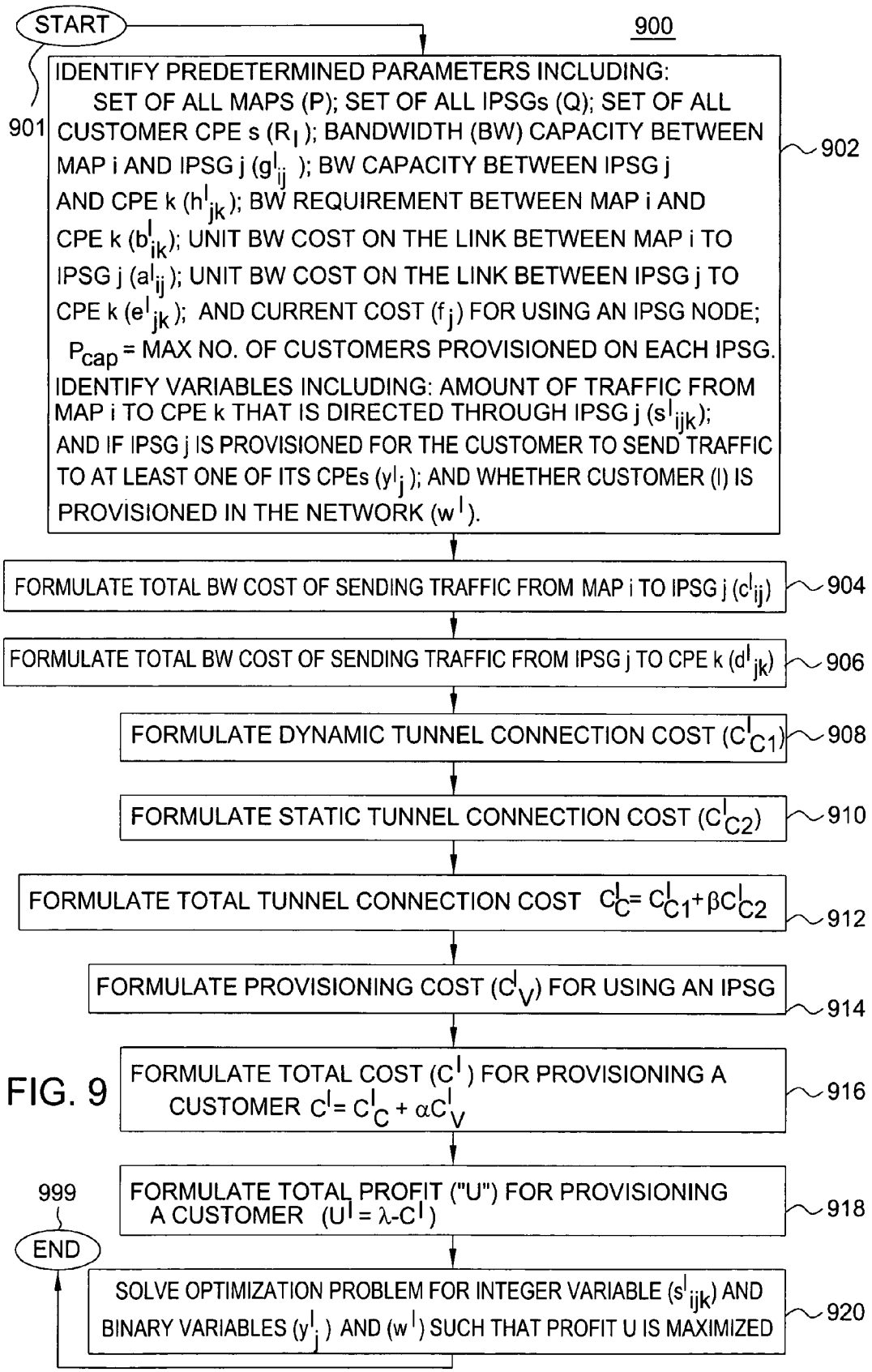
FIG. 9 depicts a flow diagram of a method suitable for selecting a subset of IP service gateways (IPSGs) to provision multiple VPN customers based on bandwidth capacity in accordance with the method of FIG. 7.

FIG. 9 depicts a flow diagram of a method 900 suitable for selecting a subset of IP service gateways (IPSGs) to provision multiple VPN customers based on bandwidth capacity in accordance with the method 700 of FIG. 7. FIG. 9 should be viewed in conjunction with FIG. 6. Method 900 starts at step 901, and proceeds to step 902, where predetermined network parameters and variables are identified.

In particular, Let T be the set of mobile VPN customers to consider such that |T|=L, where L represents the number of VPN customers. Let P be the set of all MAPs, Q be the set of all IPSGs, and R be the set of all CPEs for all customers where $R = \{R_1, R_2, \ldots, R_L, \ldots R_L\}$ and $R_l$ is the set of CPEs for customer $l \in T$, as illustratively shown in FIG. 6. Let $w^l$ be the binary variable specifying if customer l should be provisioned in the network. The optimization problem formulation for multiple mobile VPN customers may be specified as, for each customer i provisioned, every node i in P and every node k in $R_l$, choose an IPSG node j in Q, to forward traffic through a unique (dynamic) tunnel between i and j, and a shared (static) tunnel between j and k, such that the total profit for all customers is maximized. Needless to say, for a customer not provisioned, the cost is 0.

For customer $l \in T$, an integer variable $s^l_{ijk}$ is used to specify the amount of traffic from MAP $i \in P$ to CPE $k \in R_l$, which is directed through IPSG $j \in Q$. That is, $s^l_{ijk}$ represents the amount of traffic from MAP i to CPE k that is directed through IPSG j. The parameters $g_{ij}$ and $h^l_{jk}$ represent the bandwidth capacity between MAP i and IPSG j, and the bandwidth capacity between IPSG j and CPE k, respectively. The parameter $b^l_{ik}$ represents the bandwidth requirement between MAP i and CPE k. It is assumed that the capacity on the link between MAP $i \in P$ and IPSG $j \in Q$ is $g_{ij}$ units/sec, the capacity of the link between IPSG j∈Q and CPE k∈$R_l$ is $h^l_{jk}$ units/sec, and the bandwidth requirement for traffic from MAP i∈P to CPE k∈$R_l$ is $b^l_{ik}$ units/sec, where units/sec may illustratively be Mbits/second or Mbytes/second. It is also assumed that the unit bandwidth cost (1 unit/sec) on the link from MAP i to IPSG j is $a_{ij}$, the unit bandwidth cost on the link from IPSG j to CPE k is $e^l_{jk}$, and the current cost for using an IPSG node is $f_j$.

The binary variable $y^l_j \in \{0,1\}$ is 1 if IPSG j is provisioned for customer l to forward traffic to at least one of its CPEs, and is 0 if the IPSG j is not provisioned for customer l. The binary variable $w^l \in \{0,1\}$ is 1 if customer l is provisioned in the network, otherwise zero. $P_{CAP}$ represents the maximum number of customers that can be provisioned on each IPSG, and $f_j$ represents the cost for customer i to use node j. The provision cost for each customer at an IPSG is assumed to be the same. The method 900 then proceeds to step 904.

At step 904, the cost ($c^l_{ij}$) of sending traffic along the dynamic tunnel from each MAP 208 to each IPSG 206 is determined for each customer l. In particular, the bandwidth requirement for traffic from MAP i∈P to IPSG j $$\sum_{k \in R_l} s^l_{ijk}.$$

Therefore, the bandwidth cost for each customer l between MAP i and IPSG j is $$c^l_{ij} = a_{ij} \sum_{k \in R_l} s^l_{ijk}.$$

Similarly, at step 906, the cost ($d^l_{jk}$) of sending traffic along the static tunnel from each IPSG 206 to each CPE 222, and the current cost ($f_j$) for using an IPSG node (j) 206 is determined for each customer l. In particular, the bandwidth requirement for traffic from IPSG j∈Q to CPE k∈$R_l$ is $$\sum_{i \in P} s^l_{ijk}.$$

Therefore, the bandwidth cost for each customer l between IPSG j and CPE k is $$d^l_{jk} = e^l_{jk} \sum_{i \in P} s^l_{ijk}.$$

Thus, the parameters $c^l_{ij}$ and $d^l_{jk}$ respectively denote the bandwidth cost of sending traffic from node i to node j, and from node j to node k.

At step 908, the total bandwidth costs of the dynamic tunnels ($C_{C1}$) are formulated as between the MAPs ($p_i$ of FIG. 6) and IPSGs ($q_j$ of FIG. 6). Specifically, the bandwidth cost of dynamic tunnels is $$C^l_{C1} = \sum_{i \in P, j \in Q} c^l_{ij} = \sum_{i \in P, j \in Q, k \in R_l} a_{ij} s^l_{ijk}.$$

Further, at step 910, static tunnel bandwidth costs ($C^l_{C2}$) are formulated as between the IPSGs ($q_j$ of FIG. 6) and the CPEs ($r^l_k$ of FIG. 6). Specifically, the bandwidth cost of static tunnels is $$C^l_{C2} = \sum_{j \in Q, k \in R_l} d^l_{jk} = \sum_{i \in P, j \in Q, k \in R_l} e^l_{jk} s^l_{ijk}.$$

A service providers profits may be maximized by selecting optimal set of VPN customers to provision and selecting optimal IPSGs to provision each selected VPN customer. It is noted that profit ($U^l = \gamma V^l - C^l$) is the difference between weighted revenue ($\gamma V^l$) and cost ($C^l$), where revenue ($V^l$) for a customer is a fixed value if the customer can be provisioned and γ is the relative weight on revenue compared to cost.

The total cost ($C^l$) has several components, and as discussed above, such as determining the best set of IPSGs to provision each customer, which includes factoring in the cost of links in terms of bandwidth over which VPN tunnels are established, the cost of establishing each tunnel, the cost of provisioning each VPN customer on an IPSG, and redundancy in IPSG provisioning for fault tolerance. In other words, for customer l, for every MAP i in P and every CPE k in $R_l$, an IPSG j in Q is selected to establish a unique dynamic tunnel between i and j, and a shared static tunnel between j and k, such that the profit ($U^l$) is maximized.

At step 912, the total tunnel bandwidth cost ($C^l_C$) is formulated. The total bandwidth cost is the sum of the dynamic tunnel bandwidth cost and the static tunnel bandwidth cost $C^l_C = C^l_{C1} + \beta C^l_{C2}$, where β is the relative weight on the bandwidth cost of the static tunnel. Factors influencing the relative weight β on the static tunnel bandwidth cost include the cost of transporting data over core network over the cost over access network.

At step 914, the current cost $C^l_V$ of provisioning a IPSG node (j) is formulated. The binary variable $y^l_j \in \{0,1\}$ is 1 if IPSG j is provisioned for customer l to send traffic to at least one of its CPEs, and it is 0 otherwise. The parameter $f_j$ is illustratively used as the current cost of using IPSG node j. For a given customer, at most one provision is considered at any IPSG. Therefore $f_j$ has a fixed value and the provisioning cost is $$C^l_V = \sum_{j \in Q} f_j y^l_j.$$

At step 916, the total cost for the customer is formulated. In particular, the total cost is $C^l = C^l_C + \alpha C^l_V$, where a is the relative weight on the provision cost. Factors influencing the relative weight a on the provision cost include the importance of provision costs over bandwidth costs for the network service provider.

At step 918, the profit is formulated. Generally, the profit is $U^l = \gamma V^l - C^l$. Without loss of generality, we assume that the revenue for each customer provisioned is the same. Naturally, both the revenue and cost are zero for each customer not provisioned. Revenue $V^l = w^l$, where $w^l$ represents whether customer l∈T is provisioned in the network. Therefore, the profit "$U^l$" for provisioning the customer is $U^l = \gamma w^l - C^l$, where γ is the relative weight on revenue compared to total cost. The weighting factor γ essentially allows the network service provider to adjust price based on the total cost for the customer.

At step 920, given parameters, $b^l_{ik}$, $a_{ij}$, $e^l_{jk}$, $g_{ij}$, $h^l_{jk}$, $f_j$, $\alpha$, $\beta$, $\gamma$, and $P_{CAP}$, integer variables $s^l_{ijk}$, binary variables $y^l_j$, and $w^l$ are determined as the solution to the optimization problem formulation expressed as:

$$\max U = \sum_{l \in T} U^l \tag{43}$$

$$U^l = \gamma w^l - C^l, \forall l \in T, \tag{44}$$

where $$C^l = (C^l_{C1} + \beta C^l_{C2}) + \alpha C^l_V \tag{45}$$

$$C^l = \left( \sum_{i \in P, j \in Q} c^l_{ij} + \beta \sum_{j \in Q, k \in R_l} d^l_{jk} \right) + \alpha \sum_{j \in Q} f_j y^l_j \tag{46}$$

$$w^l \in \{0,1\}, \forall l \in T \tag{47}$$

$$s^l_{ijk} \geq 0, \forall l \in T, \forall i \in P, \forall j \in Q, \forall k \in R_l \tag{48}$$

$$y^l_j \in \{0,1\}, \forall l \in T, \forall j \in Q \tag{49}$$

$$\sum_{j \in Q} s^l_{ijk} = w^l b^l_{ik}, \forall l \in T, \forall i \in P, \forall k \in R_l \tag{50}$$

$$c^l_{ij} = a_{ij} \sum_{k \in R_l} s^l_{ijk}, \forall l \in T, \forall i \in P, \forall j \in Q \tag{51}$$

$$d^l_{jk} = e^l_{jk} \sum_{i \in P} s^l_{ijk}, \forall l \in T, \forall j \in Q, \forall k \in R_l \tag{52}$$

$$\sum_{l \in T, k \in R_l} s^l_{ijk} \leq g_{ij}, \forall i \in P, \forall j \in Q \tag{53}$$

$$\sum_{i \in P} s^l_{ijk} \leq h^l_{jk}, \forall l \in T, \forall j \in Q, \forall k \in R_l \tag{54}$$

$$s^l_{ijk} \leq w^l b^l_{ik}, \forall l \in T, \forall i \in P, \forall j \in Q, \forall k \in R_l \tag{55}$$

$$w^l \leq \sum_{i \in P, j \in Q, k \in R_l} s^l_{ijk}, \forall l \in T \tag{56}$$

$$s^l_{ijk} \leq y^l_j b^l_{ik}, \forall l \in T, \forall i \in P, \forall j \in Q, \forall k \in R_l \tag{57}$$

$$\sum_{l \in T} y^l_j \leq P_{CAP}, \forall j \in Q \tag{58}$$

$$y^l_j \leq w^l, \forall l \in T, \forall j \in Q \tag{59}$$

It is noted that equation (46) is an expanded version of equation (45). It is further noted that equation (50) reflects the fact that the bandwidth requirement of a customer only needs to be satisfied if the customer is provisioned. Conditions (51 through 54) are analogous to the single customer formulation discussed above. Conditions (55) and (56) are added to specify that customer l is provisioned on an IPSG only if some traffic for that customer is sent over that IPSG to a CPE. Condition (57) specifies that for a customer, if any traffic is sent through an IPSG, then the customer must be provisioned on that IPSG. Condition (58) is added to specify that the total number of provisions on each IPSG j cannot exceed its capacity $P_{CAP}$. Condition (26) is added to make sure if customer l in not provisioned, $y^l_j$ is forced to be 0. At step 999, the method 900 ends.

In order to solve the integer programming problem of steps 820 and 920 of FIGS. 8 and 9, unit bandwidth costs $a_{ij}$, $e^l_{jk}$, and provision cost $f_j$ need to be assigned appropriate values. The cost assignment can be adapted to fit the NSP's design objectives. This makes the formulation quite general and may be used for different scenarios. For example, suppose the NSP wants to satisfy a special requirement from a VPN customer that the users of this customer are not switched to a remote lightly loaded IPSG even if that reduces the total cost for the NSP. To be more specific, assume that the customer's requirement is that an MN on the east coast trying to access the corporate intranet on the east coast should not be redirected by the corresponding MAP to an IPSG on the west coast even if the total cost is minimized with this redirection. To take the constraint into account, we can either set the bandwidth capacity to 0 for the link (path) that connects the MAP to the IPSG on the west coast, or set the unit bandwidth cost on this link to infinity. For example, for a VPN customer, given MAP i in the east coast and IPSG j in the west coast, the input parameters may be assigned so that either $a_{ij} = \infty$ or $g_{ij} = 0$.

When a single customer is considered, we have the option of setting provision cost to reflect the existing number of provisions at each IPSG. For example, we can use $f_j = cap_j / avail_j$, where $cap_j$ is the capacity of IPSG j and $avail_j$ is the number of available provisions left. This cost assignment will result in even distribution of the number of provisions per IPSG across all IPSGs. However, when multiple customers are considered, the provision cost for different customers has to be the same to be a valid input to the integer programming program. Without loss of generality, we set $f_j = 1$ for IPSG j for all customers.

The number of hops from MAP node i to IPSG node j and from IPSG node j to CPE node k are assigned to unit bandwidth costs $a_{ij}$ and $e^l_{jk}$, respectively, in order to reflect the fact that unit bandwidth cost for a link is proportional to the hop count on the path that is represented by that link. In order to illustrate the relationship between bandwidth request and bandwidth capacity, the range of their values is limited. Bandwidth requests $b^l_{ik}$ is assigned to be random integers in the range [0, m], where m equals an integer greater than 1. Bandwidth capacities $g_{ij}$ is assigned to be random integers in the range [G, G+m], where G>0 is the shift on the range of $g_{ij}$ relative to that of $b^l_{ik}$. Similarly, bandwidth capacities $h^l_{jk}$ are assigned to be random integers in the range [H, H+m], where H>0 is the shift on the range of $h^l_{jk}$ relative to that of $b^l_{ik}$. The cost and capacity assignment phase accounts for customer specific requirements. Once this is performed, an integer programming package (i.e., for solving linear, mixed-integer, and quadratic programming problems), such as CPLEX, may be used to generate solution for specific parameter settings.

Thus, the present invention provides a hierarchical architecture for providing network-based Mobile VPN services. The hierarchical architecture requires the Mobile Access Points (MAPs), which provide data connectivity to the mobile users to be physically separate from the IP Services Gateway (IPSG) that provides Mobile-VPN services. The hierarchical architecture enables more efficient use of the resources in the network. Based on the hierarchical architecture, the problem of provisioning Mobile-VPN customers on the IPSGs may be solved, such that the profit realized by a Network Service Provider (NSP) by providing such a service is maximized. The cost of providing Mobile-VPN service includes the cost of bandwidth incurred, as well as the cost of provisioning the customers on the IPSGs. The constraint faced by the NSP includes the bandwidth limitation on the links that connect the devices that form part of the service provider network, and the limitation on the maximum number of customers that can be provisioned on an IPSG. An integer programming formulation is used to address this problem of provisioning Mobile-VPN customers. The formulation is general, and may be used to solve for practical configurations of the network topology and other parameters, and allows for various NSP requirements to be considered. The results provide insights into the design of Mobile-VPN architectures and services and illustrates the trade-offs that are involved in the design process.

Although various embodiments that incorporate the teachings of the present invention have been shown and described in detail herein, those skilled in the art can readily devise many other varied embodiments that still incorporate these teachings.

What is claimed is:

1. A method for optimally provisioning connectivity for network-based mobile virtual private network (VPN) services, the method comprising a network service provider for:
    identifying a set of virtual private network (VPN) customers, at least one mobile access point (MAP) and at least one customer premise equipment (CPE) associated with each VPN customer, and at least one Internet Protocol (IP) service gateway (IPSG) for facilitating VPN tunneling between a MAP and a CPE, wherein each MAP is geographically remote from each IPSG; and
    selecting a subset of IPSGs to maximize total profit resulting from provisioning a subset of VPN customers on the selected IPSGs by: (a) determining network parameters; (b) formulating an aggregate costs per customer for provisioning a customer and resultant profit; and (c) solving optimization problem for integer variable $S_{ijk}$, $Z_{jk}$ such that profit G is maximized, wherein said total profit from all the customers comprises the sum of profits from each customer (l), where for each customer profit ($U^l$) equals weighted revenue ($\gamma V^l$) less cost ($C^l$), ($U^l = \gamma V^l - C^l$), wherein said cost per customer comprises a total tunnel bandwidth cost ($C^l_C$) from said MAP to said CPE, and a cost ($C^l_V$) of provisioning an IPSG node.

2. The method of claim 1, wherein $\gamma$ represents relative weight of revenue compared to total cost for customer l.

3. The method of claim 1, wherein said total tunnel bandwidth cost comprises a dynamic tunnel bandwidth cost between said MAP and said provisioned IPSG, and a static tunnel bandwidth cost between said provisioned IPSG and said CPE.

4. The method of claim 1, wherein only a single tunnel is established between said provisioned IPSG and said CPE, even during instances where traffic from multiple MAPs are going through said provisioned IPSG to reach said CPE.

5. The method of claim 1, wherein in an instance said provisioned IPSG sends traffic to more than one CPE, said provision cost is counted only once.

6. The method of claim 1, wherein said cost per customer l is determined $$C^l = \left( \sum_{i \in P, j \in Q} c^l_{ij} + \beta \sum_{j \in Q, k \in R_l} d^l_{jk} \right) + \alpha \sum_{j \in Q} f_j y^l_j,$$

by where $c^l_{ij}$ is a bandwidth cost associated with sending traffic from a MAP node i to an IPSG node j, $d^l_{jk}$ is a bandwidth cost associated with sending traffic from said IPSG node j to said CPE node k, $\beta$ represents a weighing factor with respect to said shared static tunnel, $f_j$ is a provisioning cost associated with using said IPSG node j, $y^l_j$ is a binary variable denoting whether said IPSG j is provisioned for a provisioned customer to send traffic to at least one of its CPEs, and $\alpha$ is a weighing factor for provision cost over total bandwidth cost.

7. The method of claim 6, wherein said bandwidth cost ($c^l_{ij}$) associated with sending traffic from a MAP node i to an IPSG node j comprises the product of unit bandwidth cost ($a_{ij}$) between said MAP node i and said IPSG node j, and a sum of traffic $$\left( \sum_{k \in R_l} s^l_{ijk}, \forall i \in P, \forall j \in Q \right)$$

from MAP node i to said CPE node k that is directed through IPSG node j.

8. The method of claim 6, wherein said bandwidth cost ($d^l_{jk}$) associated with sending traffic from an IPSG node j to a CPE node k comprises the product of unit bandwidth cost ($e^l_{jk}$) between said IPSG node j and said CPE node k, and a total amount of traffic $$\left( \sum_{i \in R_l} s^l_{ijk}, \forall j \in Q, \forall k \in R_l \right)$$

from MAP node i to said CPE node k that is directed through IPSG node j.

9. The method of claim 6, wherein said total amount of traffic $$\left( \sum_{k \in R_l} s^l_{ijk} \right)$$

from MAP node i to said IPSG node j is less than or equal to total bandwidth capacity ($g_{ij}$) between said MAP node i and said IPSG node j.

10. The method of claim 6, wherein said total amount of traffic $$\left( \sum_{i \in P} s^l_{ijk} \right)$$

from said IPSG node j to said CPE node k is less than or equal to total bandwidth capacity ($h^l_{jk}$) between said IPSG node j and said CPE node k.

11. A virtual private network (VPN) system architecture, comprising:
  means for identifying a set of virtual private network (VPN) customers, at least one mobile access point (MAP) and at least one customer premise equipment (CPE) associated with each VPN customer, and at least one Internet Protocol (IP) service gateway (IPSG) for facilitating VPN tunneling between a MAP and a CPE, wherein each MAP is geographically remote from each IPSG; and
  means for selecting a subset of IPSGs to maximize total profit resulting from provisioning a subset of VPN customers on the selected IPSGs by: (a) determining network parameters; (b) formulating an aggregate costs per customer for provisioning a customer and resultant profit; and (c) solving optimization problem for integer variable $S_{ijk}$, $Z_{jk}$ such that profit G is maximized, wherein said total profit from all the customers comprises the sum of profits from each customer (l), where for each customer profit ($U^l$) equals weighted revenue ($\gamma V^l$) less cost ($C^l$), ($U^l = \gamma V^l - C^l$), wherein said cost per customer comprises a total tunnel bandwidth cost ($C^l{}_C$) from said MAP to said CPE, and a cost ($C^l{}_V$) of provisioning an IPSG node.

12. The system architecture of claim 11, wherein $\gamma$ represents relative weight of revenue compared to total cost for customer l.

13. The system architecture of claim 11, wherein said total tunnel bandwidth cost comprises a dynamic tunnel bandwidth cost between said MAP and said provisioned IPSG, and a static tunnel bandwidth cost between said provisioned IPSG and said CPE.

14. The system architecture of claim 11, wherein only a single tunnel is established between said provisioned IPSG and said CPE, even during instances where traffic from multiple MAPs are going through said provisioned IPSG to reach said CPE.

15. The system architecture of claim 11, wherein in an instance said provisioned IPSG sends traffic to more than one CPE, said provision cost is counted only once.

16. The system architecture of claim 11, wherein said cost per customer l is determined by $$C^l = \left( \sum_{i \in P, j \in Q} c^l_{ij} + \beta \sum_{j \in Q, k \in R_l} d^l_{jk} \right) + \alpha \sum_{j \in Q} f_j y^l_j,$$

where $c^l_{ij}$ is a bandwidth cost associated with sending traffic from a MAP node i to an IPSG node j, $d^l_{jk}$ is a bandwidth cost associated with sending traffic from said IPSG node j to said CPE node k, $\beta$ represents a weighing factor with respect to said shared static tunnel, $f_j$ is a provisioning cost associated with using said IPSG node, $y^l_j$ is a binary variable denoting whether said IPSG j is provisioned for a provisioned customer to send traffic to at least one of its CPEs, and $\alpha$ is a weighing factor for provision cost over total bandwidth cost.

17. The system architecture of claim 16, wherein said bandwidth cost ($c^l_{ij}$) associated with sending traffic from a MAP node i to an IPSG node j comprises the product of unit bandwidth cost ($a_{ij}$) between said MAP node i and said IPSG node j, and a sum of traffic $$\left( \sum_{k \in R_l} s^l_{ijk}, \forall i \in P, \forall j \in Q \right)$$

from MAP node i to said CPE node k that is directed through IPSG node j.

18. The system architecture of claim 16, wherein said bandwidth cost ($d^l_{jk}$) associated with sending traffic from an IPSG node j to a CPE node k comprises the product of unit bandwidth cost ($e^l_k$) between said IPSG node j and said CPE node k, and a total amount of traffic $$\left( \sum_{i \in P} s^l_{ijk}, \forall j \in Q, \forall k \in R_l \right)$$

from MAP node i to said CPE node k that is directed through IPSG node j.

19. The system architecture of claim 16, wherein said total amount of traffic $$\left( \sum_{k \in R_l} s^l_{ijk} \right)$$

from MAP node i to said IPSG node j is less than or equal to total bandwidth capacity ($g_{ij}$) between said MAP node i to said IPSG node j.

20. The system architecture of claim 16, wherein said total of traffic $$\left( \sum_{i \in P} s^l_{ijk} \right)$$

from said IPSG node j to said CPE node k is less than or equal to total bandwidth capacity ($h^l_{jk}$) between said IPSG node j and said CPE node k.

21. The system architecture of claim 11, wherein said MAPs provide dynamic switching and routing of data connections, while said IPSGs provide VPN services.

22. A computer readable medium for storing instructions that, when executed by a processor, perform a method for optimally provisioning connectivity for network-based mobile virtual private network (VPN) services, comprising:
  identifying a set of virtual private network (VPN) customers, at least one mobile access point (MAP) and at least one customer premise equipment (CPE) associated with each VPN customer, and at least one Internet Protocol (IP) service gateway (IPSG) for facilitating VPN tunneling between a MAP and a CPE, wherein each said MAP is geographically remote from each said IPSG; and
  selecting a subset of IPSGs to maximize total profit resulting from provisioning a subset of VPN customers on the selected IPSGs by: (a) determining network parameters; (b) formulating an aggregate costs per customer for provisioning a customer and resultant profit; and (c) solving optimization problem for integer variable $S_{ijk}$, $Z_{jk}$ such that profit G is maximized, wherein said total profit from all the customers comprises the sum of profits from each customer (l), where for each customer profit ($U^l$) equals weighted revenue ($\gamma V^l$) less cost ($C^l$) ($U^l = \gamma V^l - C^l$), wherein said cost per customer comprises a total tunnel bandwidth cost ($C^l{}_C$) from said MAP to said CPE, and a cost ($C^l{}_V$) of provisioning an IPSG node.

* * * * *